United States Patent
Lee

(10) Patent No.: US 11,157,402 B2
(45) Date of Patent: Oct. 26, 2021

(54) APPARATUS AND METHOD FOR MANAGING VALID DATA IN MEMORY SYSTEM

(71) Applicant: SK hynix Inc., Gyeonggi-do (KR)

(72) Inventor: Jong-Min Lee, Seoul (KR)

(73) Assignee: SK hynix Inc., Gyeonggi-do (KR)

(*) Notice: Subject to any disclaimer, the term of this patent is extended or adjusted under 35 U.S.C. 154(b) by 52 days.

(21) Appl. No.: 16/531,961

(22) Filed: Aug. 5, 2019

(65) Prior Publication Data
US 2020/0081833 A1 Mar. 12, 2020

(30) Foreign Application Priority Data
Sep. 12, 2018 (KR) .................. 10-2018-0108840

(51) Int. Cl.
*G06F 12/02* (2006.01)
*G06F 12/10* (2016.01)

(52) U.S. Cl.
CPC .......... *G06F 12/0269* (2013.01); *G06F 12/10* (2013.01); *G06F 2212/1044* (2013.01); *G06F 2212/7201* (2013.01); *G06F 2212/7205* (2013.01)

(58) Field of Classification Search
CPC ................ G06F 12/0269; G06F 12/10; G06F 2212/1044; G06F 2212/7201; G06F 2212/7205
See application file for complete search history.

(56) References Cited

U.S. PATENT DOCUMENTS

| | | | |
|---|---|---|---|
| 2012/0173797 A1* | 7/2012 | Shen | G06F 12/0246 711/103 |
| 2012/0221782 A1 | 8/2012 | Lee et al. | |
| 2013/0151754 A1 | 6/2013 | Post et al. | |

* cited by examiner

*Primary Examiner* — Eric Cardwell
(74) *Attorney, Agent, or Firm* — IP & T Group LLP

(57) ABSTRACT

A memory system includes a memory device including plural blocks, each capable of storing data, and a controller coupled with the memory device. The controller can generate a blocklist including a valid page count for at least one target block among the plural blocks before updating a map data, update the map data and the valid page count of the at least one target block, compare the previous valid page count stored in the blocklist with the updated valid page count, and erase invalid map data of the at least one target block according to a comparison result.

20 Claims, 17 Drawing Sheets

<BL_B>

| BLOCK | VPC | UPDATED VPC | CH_VPC |
|---|---|---|---|
| xBLK1 | 100 | 50 | 50 |
| xBLK5 | 70 | 30 | 40 |
| xBLK3 | 50 | 20 | 30 |
| xBLK2 | 90 | 80 | 10 |
| xBLK4 | 100 | 100 | 0 |

| BLOCK | VPC |
|---|---|
| xBLK1 | 100 |
| xBLK2 | 90 |
| xBLK3 | 50 |
| xBLK4 | 100 |
| xBLK5 | 70 |

| BLOCK | VPC | UPDATED VPC | CH_VPC |
|---|---|---|---|
| xBLK1 | 100 | 50 | 50 |
| xBLK5 | 70 | 30 | 40 |
| xBLK3 | 50 | 20 | 30 |
| xBLK2 | 90 | 80 | 10 |
| xBLK4 | 100 | 100 | 0 |

APPARATUS AND METHOD FOR MANAGING VALID DATA IN MEMORY SYSTEM

CROSS-REFERENCE TO RELATED APPLICATION

This patent application claims priority to Korean Patent Application No. 10-2018-0108840, filed on Sep. 12, 2018, the entire disclosure of which is incorporated herein by reference.

TECHNICAL FIELD

Various embodiments of the disclosure generally relate to a memory system. Particularly, the embodiments relate to an apparatus and a method for determining a target or a range for garbage collection in plural memory blocks of a non-volatile memory device.

BACKGROUND

The computer environment paradigm has shifted to ubiquitous computing, which enables a computer system to be used anytime and practically everywhere. As a result, the use of portable electronic devices such as mobile phones, digital cameras, notebook computers and the like have been rapidly increasing. Such portable electronic devices typically use or include a memory system that uses or embeds at least one memory device, i.e., a data storage device. The data storage device can be used as a main storage device or an auxiliary storage device of a portable electronic device.

Unlike characteristics of a hard disk, a data storage device using a nonvolatile semiconductor memory device has advantages such as excellent stability and durability, because it has no mechanical driving part (e.g., a mechanical arm), and has high data access speed and low power consumption. As an example of a memory system having such advantages, a data storage device includes a USB (Universal Serial Bus) memory device, a memory card having various interfaces, a solid state drive (SSD) or the like.

SUMMARY

A memory system can include a memory device including plural blocks, each capable of storing data, and a controller, coupled with the memory device. The controller is configured to generate a blocklist including a valid page count for at least one target block among the plural blocks before updating a map data, update the map data and the valid page count of the at least one target block, compare the previous valid page count stored in the blocklist with the updated valid page count, and erase invalid map data of the at least one target block according to a comparison result.

An apparatus can control a metadata included in a memory system including at least one processor and at least one memory including computer program code. The at least one memory and the computer program code can be configured, with the at least one processor, to cause the apparatus to: generate a blocklist including a valid page count for at least one target block among plural blocks included in a memory device of the memory system; update the map data and the valid page count of the at least one target block; compare the previous valid page count stored in the blacklist with the updated valid page count; and erase invalid map data of the at least one target block according to a compared result.

A memory system can include a memory device, a map table, and a controller. The memory device includes plural blocks, each having plural pages, each configured to store data. The map table configured to store plural pieces of physical-to-logical (P2L) map data corresponding to each of the blocks. The controller configured to: update one or more pieces based on access to one block among the blocks; and remove, from the map table, one or more invalid pieces having the same logical address representing the accessed block, a valid page count of which varies by a greater amount than a threshold due to the update.

BRIEF DESCRIPTION OF THE DRAWINGS

The description herein makes reference to the accompanying drawings wherein like reference numerals refer to like parts throughout the several views, and wherein:

FIGS. 7A and 7B are diagrams illustrating a blocklist in accordance with an embodiment of the disclosure;

DETAILED DESCRIPTION

Figure 1:
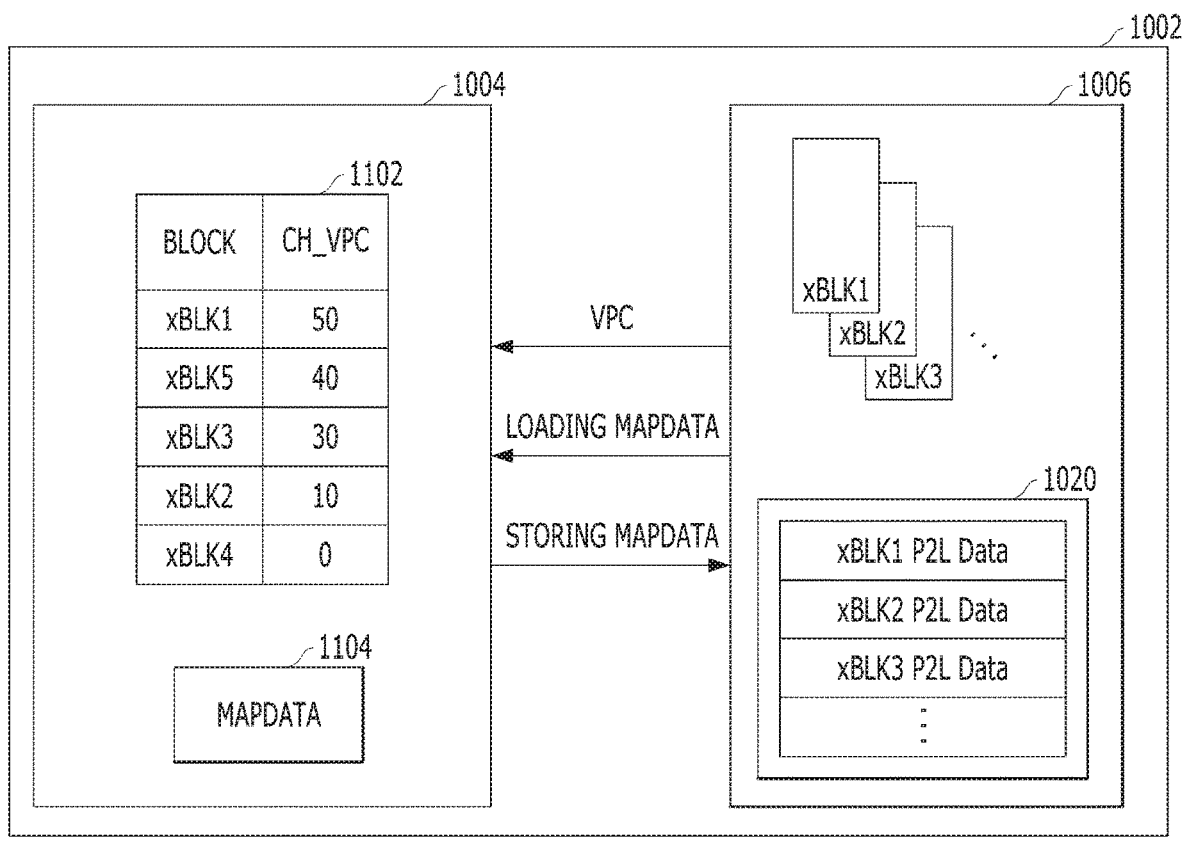
FIG. 1 is a block diagram illustrating a memory system in accordance with an embodiment of the disclosure.

Various examples of the disclosure are described below in more detail with reference to the accompanying drawings. The disclosure may be embodied in other embodiments, forms and variations thereof and should not be construed as being limited to the embodiments set forth herein. Rather, the described embodiments are provided so that this disclosure is thorough and complete, and will fully convey the disclosure to those skilled in the art to which this invention pertains. In the disclosure, like reference numerals refer to like parts used throughout the various figures and examples of the disclosure. It is noted that reference to "an embodiment," "another embodiment" or the like does not necessarily mean only one embodiment, and different references to any such phrase are not necessarily to the same embodiment(s).

It will be understood that, although the terms "first", "second", "third", and so on may be used herein to describe various elements, these elements are not limited by these terms. These terms are used to distinguish one element from another element that otherwise have the same or similar names. Thus, a first element in one instance may be referred to as a second or third element in another instance without departing from the spirit and scope of the invention.

The drawings are not necessarily to scale and, in some instances, proportions may have been exaggerated to clearly illustrate features of the embodiments. When an element is referred to as being connected or coupled to another element, it should be understood that the former can be directly connected or coupled to the latter, or electrically connected or coupled to the latter via one or more intervening elements. Communication between two elements, whether directly or indirectly connected/coupled, may be wired or wireless, unless the context indicates otherwise. In addition, it will also be understood that when an element is referred to as being "between" two elements, it may be the only element between the two elements, or one or more intervening elements may also be present.

The terminology used herein is for the purpose of describing particular embodiments only and is not intended to be limiting of the invention.

As used herein, singular forms are intended to include the plural forms and vice versa, unless the context clearly indicates otherwise. The articles 'a' and 'an' as used in this application and the appended claims should generally be construed to mean 'one or more' unless specified otherwise or it is clear from context to be directed to a singular form.

It will be further understood that the terms "comprises," "comprising," "includes," and "including" when used in this specification, specify the presence of the stated elements and do not preclude the presence or addition of one or more other elements. As used herein, the term "and/or" includes any and all combinations of one or more of the associated listed items.

Unless otherwise defined, all terms including technical and scientific terms used herein have the same meaning as commonly understood by one of ordinary skill in the art to which the disclosure pertains in view of the present disclosure. It will be further understood that terms, such as those defined in commonly used dictionaries, should be interpreted as having a meaning that is consistent with their meaning in the context of the disclosure and the relevant art, and will not be interpreted in an idealized or overly formal sense unless expressly so defined herein.

In the following description, numerous specific details are set forth in order to provide a thorough understanding of the invention. The invention may be practiced without some or all of these specific details. In other instances, well-known process structures and/or processes have not been described in detail in order not to unnecessarily obscure the invention.

It is also noted, that in some instances, as would be apparent to those skilled in the relevant art, a feature or element described in connection with one embodiment may be used singly or in combination with other features or elements of another embodiment, unless otherwise specifically indicated.

Embodiments of the invention provide a memory system, a data processing system, and an operation process or a method, which can quickly and reliably process data into a memory device by reducing operational complexity and performance degradation of the memory system, and which can enhance usage efficiency of the memory device.

The disclosure can provide a method and an apparatus which are capable of generating a block list including a count of valid data for at least one target block, before updating a map data for linking a physical address with a logical address, comparing the count of valid data before updating the map data with a count after updating the map data, and distinguishing at least a part of invalid data in the at least one target block.

In addition, the disclosure can provide a method and an apparatus which can simplify a control method for determining which block includes a lot of unnecessary or invalid data, or determining which block is selected for garbage collection to secure a free block among memory blocks allocated for storing data in the memory device. The method and the apparatus can reduce a time required to search and select a block for the garbage collection.

In an embodiment, a memory system can include a memory device including plural blocks, each capable of storing data; and a controller, coupled with the memory device, suitable for generating a blacklist including a valid page count for at least one target block among the plural blocks before updating a map data, updating the map data and the valid page count of the at least one target block, comparing the previous valid page count stored in the blocklist with the updated valid page count, and erasing invalid map data of the at least one target block according to a comparison result.

By way of example but not limitation, the at least one target block can be in a status such that new data cannot be programmed in the at least one target block without an erase operation to data stored therein.

The at least one target block can include a predetermined number of blocks which are selected in a reverse order of time from a block last accessed by the controller.

The blocklist can include the updated valid page count.

The controller can arrange or sort the at least one target block in the blocklist in a descending order of a difference between the previous valid page count and the updated valid page count.

The controller can determine whether the difference between the previous valid page count and the updated valid page count is equal to or greater than a predetermined threshold, and check whether there are duplicated map data of the target block when the difference is equal to or greater than the predetermined threshold.

The map data of the target block includes mapping information for translating a physical address to a logical address. When there are duplicated map data, the controller erases or deletes an old one of the duplicated map data.

By way of example but not limitation, the block is an operational unit for an erase operation, and the block includes plural unit blocks, each assigned to each of plural map data controlled as a group. The controller can determine the valid page count for each unit block, and the blocklist includes the valid page count of each unit block selected as the target block.

The controller stores the map data of the at least one target block after erasing the invalid map data.

The controller can include a blocklist generating circuitry for selecting the at least one target block included in the memory device and generating the blocklist including information associated with the at least one target block; and a map data managing circuitry for comparing the previous valid page count with the updated valid page count, for each of the at least one target block, and erasing the invalid map data according to the comparison result.

In another embodiment, an apparatus can be provided for controlling a metadata included in a memory system including at least one processor and at least one memory including computer program code. The at least one memory and the computer program code can be configured, with the at least one processor, to cause the apparatus to: generate a blocklist including a valid page count for at least one target block among plural blocks included in a memory device of the memory system; update the map data and the valid page count of the at least one target block; compare the previous valid page count stored in the blocklist with the updated valid page count; and erase invalid map data of the at least one target block according to a compared result.

In another embodiment, a method for operating a memory system can include generating a blocklist including a valid page count for at least one target block among plural blocks included in a memory device; updating the map data and the valid page count of the at least one target block; comparing the previous valid page count stored in the blocklist with the updated valid page count; and erasing invalid map data of the at least one target block according to a compared result.

By way of example but not limitation, the method can further include determining whether the at least one target block is in a status in which new data cannot be programmed without an erase operation to data stored therein.

The at least one target block can include a predetermined number of blocks which are selected in a reverse order of time from a block last accessed by the controller.

The blocklist can include the updated valid page count.

The method can further include arranging or sorting the at least one target block in the blocklist in a descending order of a difference between the previous valid page count and the updated valid page count.

The method can further include determining whether the difference between the previous valid page count and the updated valid page count is equal to or greater than a predetermined threshold; and checking whether there are duplicated map data of the target block when the difference is equal to or greater than the predetermined threshold.

The invalid map data can be, when there are duplicated map data, an old one of the duplicated map data. The map data of the target block includes mapping information for translating a physical address to a logical address.

By way of example but not limitation, the block is an operational unit for an erase operation, and the block includes plural unit blocks, each assigned to each of plural map data controlled as a group. The controller can determine the valid page count for each unit block, and the blocklist includes the valid page count of each unit block selected as the target block.

The method can further include storing the map data of the at least one target block after erasing the invalid map data.

In another embodiment, a memory system can include a memory device including plural blocks each having plural pages each configured to store data; a map table configured to store plural pieces of physical-to-logical (P2L) map data corresponding to each of the blocks; and a controller configured to: update one or more pieces based on access to one block among the blocks; and remove, from the map table, one or more invalid pieces having the same logical address representing the accessed block, a valid page count of which varies by a greater amount than a threshold due to the update.

Embodiments of the disclosure will be described in detail with reference to the accompanied drawings.

FIG. 1 describes a memory system 1002 in accordance with an embodiment of the disclosure. As shown, the memory system 1002 may include a controller 1004 and a memory device 1006.

Referring to FIG. 1, the memory device 1006 may include a plurality of blocks (xBLK1, xBLK2, xBLK3, . . . ) each capable of storing data. Each of the plurality of blocks (xBLK1, xBLK2, xBLK3, . . . ) can include a plurality of pages each capable of storing data.

The page storing the data in the memory device 1006 can be identified by a physical address. By way of example but not limitation, by using address information indicating a first page pg0 of a first block (xBLK1), a location where data is stored in the memory device 1006 can be specified. The memory system 1002 may recognize address information regarding pages in which data is stored, but a host (shown in FIGS. 2 to 3) engaged with the memory system 1002 may not recognize the address information like the physical address used in the memory system 1002.

The host can manage a data generated by itself or inputted from a user, using its own address system. Here, the address system used by the host may be referred to as a logical address. Because the host wants to use a logical address for reading or writing a data, the memory system 1002 needs to translate a logical address entered by the host into a physical address that is used in the memory system 1002. The controller 1004 in the memory system 1002 may include this address translation function.

For operational efficiency, the controller 1004 may generate or manage first address information for translating a logical address into a physical address, and second address information for translating a physical address to a logical address. The first address information and the second address information generated by the controller 1004 may be stored in the memory device 1006. For example, the memory device 1006 may include a map table 1020 storing map data (xBLK1 P2L Data, xBLK2 P2L Data, xBLK3 P2L Data, . . . ) each corresponding to each data stored in the plurality of blocks (xBLK1, xBLK2, xBLK3, . . . ). The map data may be the second address information.

If necessary, the controller 1004 may load all or parts of the first address information and the second address information, and store the same at a memory 114 (shown in FIGS. 2 to 3) inside the controller 1004. In accordance with an embodiment, the controller 1004 can update or manage changed values after loading the map table 1020 in a space (e.g., the internal memory 114) where data in the controller 1004 can be stored. The updated map table 1020 can be stored in the memory device 1006. When the last updated map table 1020 is stored in the memory device 1006, the previous map data stored in the memory device 1006 may not be used anymore.

Referring to FIG. 1, the controller 1004 may include a block list 1102 and a map data 1104.

The controller 1004 may generate the block list 1102 based on operation information or status information for a plurality of blocks (xBLK1, xBLK2, xBLK3, . . . ) in the memory device 1006. The operation information or the state information may include a valid page count (VPC) of each of a plurality of blocks (xBLK1, xBLK2, xBLK3, xBLK4, xBLK5, . . . ) in the memory device 1006.

The controller 1004 can recognize a change of valid page count (VPC) before and after the update of the map data for each block (xBLK1, xBLK2, xBLK3, xBLK4, xBLK5, . . . ) in the memory device 1006. The controller 1004 can generate the block list 1102 based on the change of valid page count CH_VPC for each block, and arrange or sort items for each block of the block list 1102 in the order of a larger change of valid page count. In accordance with an embodiment, the controller 1004 can generate the block list 1102 for all or a part of the plurality of blocks (xBLK1, xBLK2, xBLK3, . . . ) included in the memory device 1006. For example, the block list 1102 may include a block in which the data has been last accessed, the latest program operation has been performed, or a map data of the data stored therein has been updated. When a block storing plural data is not accessed for a long time, that block might be not included in the block list 1102.

In accordance with an embodiment, the controller 1004 can check the change of valid page count CH_VPC for each block at predetermined timings, e.g., before and after a program operation is performed, a map data is updated, or the like. By way of example but not limitation, the changes of valid page counts CH_VPC for each block are 50 for the first block (xBLK1), 10 for the second block (xBLK2), 30 for the third block (xBLK3), 0 for the fourth block (xBLK4) and 40 for the fifth block (xBLK5).

Although not shown in FIG. 1, the number of valid pages before an update of map data and the number of valid pages after the update of map data may be included in the block list 1102. Another example of the block list 1102 will be described later with reference to FIGS. 7A and 7B.

The controller 1004 loads map data stored in the memory device 1006 and stores the loaded map data in a memory, and then updates the map data when a location of data indicated by the map data is changed or a new data is programmed in the memory device 1006. For example, the controller 1004 may receive a command entered from a host and perform a program operation. The controller 1004 can update the map data 1104 including the first and second address information corresponding to the location where the data is stored according to execution of the program operation. In addition, the controller 1004 can recognize the change of valid page count CH_VPC for each block, along with the update of the map data 1104.

In accordance with an embodiment, the controller 1004 can access the map table 1020 and store the map data of the blocks included in the block list 1102 in the memory. In accordance with another embodiment, the controller 1004 may access or store only map data of a block, the map data of which is required to be updated among target blocks. For this purpose, the controller 1004 can determine or select the target block, satisfying a specific condition, from the block list 1102. In another example, when the change of valid page count CH_VPC regarding the block included in the block list 1102 is equal to or larger than a predetermined threshold, a duplicated one among the map data of the corresponding block can be deleted or erased. In this disclosure, duplicated map data means P2L map data having the same logical address mapped to different physical address.

In accordance with an embodiment, when the change of valid page count CH_VPC for the target block included in the block list 1102 is 45 or more, map data of the corresponding block can be organized, deleted, managed or cleaned up. Referring to FIG. 1, since the first block xBLK1 in the block list 1102 meets this condition, the controller 1004 can clean up the map data of the first block xBLK1. In order to clean up the map data of the first block (xBLK1), the controller 1004 can determine whether there is any duplicated map data, which corresponds to data stored in the first block (xBLK1) which has the same logical address as the map data corresponding to the data stored in the first block (xBLK1) due to the update of the map data.

For example, data corresponding to a logical address 'AA' designated by the host has been updated three times during a specific operation. Since the memory device 1006 does not support overwriting, the controller 1004 included in the memory system 1002 can program corresponding data three times in different storage locations within the same block or in neighboring blocks. That is, the data corresponding to the logical address 'AA' designated by the host are stored in three storage locations. Moreover, regarding the data represented by the logical address 'AA', there are three pieces of "duplicated" map data having the same logical address 'AA' mapped to three different physical addresses. As defined above, duplicated map data means P2L map data having the same logical address mapped to different physical address. However, there is only one valid data corresponding to the same logical address 'AA', which is stored at three locations in memory device 1006, and the other two locations of which are no longer valid. Accordingly, the controller 1004 can search duplicated map data in the map table 1020 stored in the memory device 1006 and delete the remainder of the duplicated ones, i.e., two map data corresponding to two old data, except for the latest one. In some cases, the number of redundant map data may be equal to the change of valid page count CH_VPC.

In accordance with an embodiment, the controller 1004 can search for duplicated ones, e.g., invalid map data for the first block xBLK1 among the map data 1104 for the at least one target block included in the block list 1102, and delete or erase the duplicated one in the map data 1104 after the map data are updated. The controller 1004 does not use the existing map data for the first block xBLK1 stored in the map table 1020 anymore. But, the controller 1004 can store the updated and cleaned up map data for the first block xBLK1 in the memory device 1006.

In accordance with an embodiment, the controller 1004 may generate a block list including a valid page count of the at least one target block before the operation of updating the map data is performed. In addition, the controller 1004 can compare the previous valid page count and the updated valid page count, for the target block included in the block list, after the map data are updated, and clean up the map data for the target block in accordance with a comparison result. Here, the valid page count can be checked or recognized at each time point included in the generated block list. The controller 1004 can estimate how much the map data becomes invalid (e.g., pattern or trend) based on the change of valid page count CH_VPC.

The controller 1004 can adjust, invalidate or remove some of the map data for a specific block when the change of the valid page count CH_VPC exceeds a predetermined threshold. A large change in the valid page count for a block may indicate that there is a large amount of invalid data among the data stored in the corresponding block. Accordingly, when a small resource of the memory system 1002 may be used to invalidate or delete at least some of the map data corresponding to the data stored in the specific block, an operation of searching for or extracting the valid data in the block for garbage collection performed later can be made easier or faster.

Furthermore, in accordance with an embodiment, when the change of valid page count CH_VPC for a specific block does not exceed the preset range, the controller 1004 may not clean up the map data of that block. In this case, it may not be efficient for the controller 1004 to determine whether there are duplicated map data and extract invalid map data from the map data, because the amount of change in the valid page count is insignificant.

Figure 2:
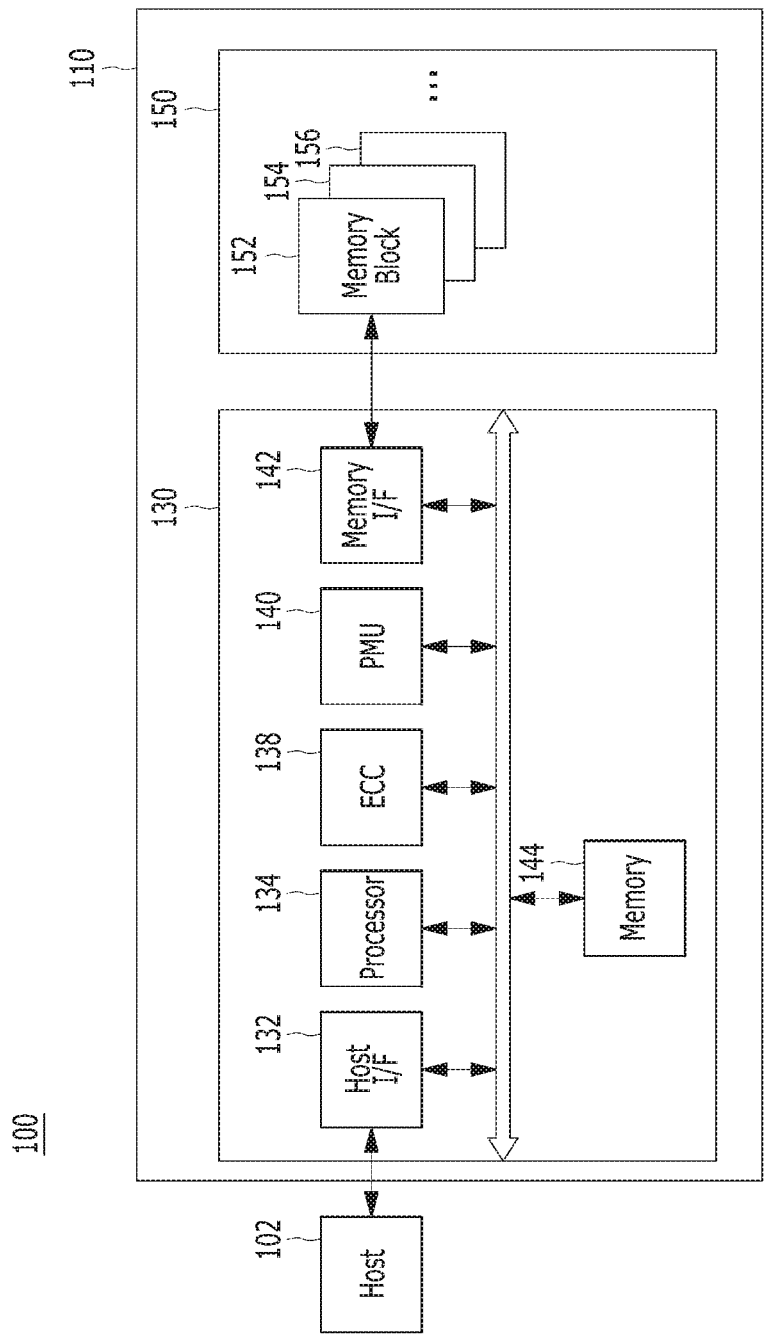
FIG. 2 is a block diagram illustrating a data processing system including a memory system in accordance with an embodiment of the disclosure.

In FIG. 2, a data processing system 100 in accordance with an embodiment of the disclosure is described. Referring to FIG. 2, the data processing system 100 may include a host 102 engaged or interlocked with a memory system 110.

The host 102 may include, for example, a portable electronic device such as a mobile phone, an MP3 player and a laptop computer or an electronic device such as a desktop computer, a game player, a television (TV), a projector and the like.

The host 102 also includes at least one operating system (OS), which can generally manage and control, functions and operations performed in the host 102. The OS can provide interoperability between the host 102 engaged with the memory system 110 and the user needing and using the memory system 110. The OS may support functions and operations corresponding to user's requests. By way of example but not limitation, the OS can be classified into a general operating system and a mobile operating system according to mobility of the host 102. The general operating system may be split into a personal operating system and an enterprise operating system according to system requirements or a user's environment. The personal operating system, including Windows and Chrome, may be subject to support services for general purposes. But the enterprise operating systems can be specialized for securing and supporting high performance, including Windows servers, Linux, Unix and the like. Further, the mobile operating system may include an Android, an iOS, a Windows mobile and the like. The mobile operating system may be subject to support services or functions for mobility (e.g., a power saving function). The host 102 may include a plurality of operating systems. The host 102 may execute multiple operating systems interlocked with the memory system 110, corresponding to user's request. The host 102 may transmit a plurality of commands corresponding to user's requests into the memory system 110, thereby performing operations corresponding to commands within the memory system 110. Handling plural commands in the memory system 110 is described later, referring to FIGS. 4 and 5.

The memory system 110 may operate or perform a specific function or operation in response to a request from the host 102 and, particularly, may store data to be accessed by the host 102. The memory system 110 may be used as a main memory system or an auxiliary memory system of the host 102. The memory system 110 may be implemented with any one of various types of storage devices, which may be electrically coupled with the host 102, according to a protocol of a host interface. Non-limiting examples of suitable storage devices include a solid state drive (SSD), a multimedia card (MMC), an embedded MMC (eMMC), a reduced size MMC (RS-MMC), a micro-MMC, a secure digital (SD) card, a mini-SD, a micro-SD, a universal serial bus (USB) storage device, a universal flash storage (UFS) device, a compact flash (CF) card, a smart media (SM) card, a memory stick, and the like.

The storage devices for the memory system 110 may be implemented with a volatile memory device, for example, a dynamic random access memory (DRAM) and a static RAM (SRAM), and/or a nonvolatile memory device such as a read only memory (ROM), a mask ROM (MROM), a programmable ROM (PROM), an erasable programmable ROM (EPROM), an electrically erasable programmable ROM (EEPROM), a ferroelectric RAM (FRAM), a phase-change RAM (PRAM), a magneto-resistive RAM (MRAM), a resistive RAM (RRAM or ReRAM) and a flash memory.

The memory system 110 may include a controller 130 and a memory device 150. The memory device 150 may store data to be accessed by the host 102. The controller 130 may control storage of data in the memory device 150.

The controller 130 and the memory device 150 may be integrated into a single semiconductor device, which may be included in the various types of memory systems as exemplified above.

By way of example but not limitation, the controller 130 and the memory device 150 may be integrated into a single semiconductor device. The controller 130 and memory device 150 configuring an SSD may be integrated into a single semiconductor device for improving an operation speed. When the memory system 110 is used as an SSD, the operating speed of the host 102 connected to the memory system 110 can be improved more than that of the host 102 implemented with a hard disk. In addition, the controller 130 and the memory device 150 integrated into one semiconductor device may form a memory card. For example, a PC card (PCMCIA), a compact flash card (CF), a memory card such as a smart media card (SM, SMC), a memory sticks, a multimedia card (MMC, RS-MMC, MMCmicro), a SD card (SD, miniSD, microSD, SDHC), a universal flash memory and the like.

The memory system 110 may be configured as a part of, for example, a computer, an ultra-mobile PC (UMPC), a workstation, a net-book, a personal digital assistant (PDA), a portable computer, a web tablet, a tablet computer, a wireless phone, a mobile phone, a smart phone, an e-book, a portable multimedia player (PMP), a portable game player, a navigation system, a black box, a digital camera, a digital multimedia broadcasting (DMB) player, a 3-dimensional (3D) television, a smart television, a digital audio recorder, a digital audio player, a digital picture recorder, a digital picture player, a digital video recorder, a digital video player, a storage configuring a data center, a device capable of transmitting and receiving information under a wireless environment, one of various electronic devices configuring a home network, one of various electronic devices configuring a computer network, one of various electronic devices configuring a telematics network, a radio frequency identification (RFID) device, or one of various components configuring a computing system.

The memory device 150 may be a nonvolatile memory device and may retain data stored therein even while an electrical power is not supplied. The memory device 150 may store data provided from the host 102 through a write operation, while providing data stored therein to the host 102 through a read operation. The memory device 150 may include a plurality of memory blocks 152, 154, 156. Each of the memory blocks 152, 154, 156 may include a plurality of pages. Each of the plurality of pages may include a plurality of memory cells to which a plurality of word lines (WL) are electrically coupled. The memory device 150 also includes a plurality of memory dies including a plurality of planes, each memory die including a plurality of planes, each plane including a plurality of memory blocks 152, 154, 156. In addition, the memory device 150 may be a non-volatile memory device, for example a flash memory, wherein the flash memory may be a three-dimensional stack structure.

The controller 130 may control overall operations of the memory device 150, such as read, write, program, and erase operations. For example, the controller 130 may control the memory device 150 in response to a request from the host 102. The controller 130 may provide the data, read from the memory device 150, to the host 102. The controller 130 may store the data, provided by the host 102, into the memory device 150.

The controller 130 may include a host interface (I/F) 132, a processor 134, an error correction code (ECC) unit 138, a power management unit (PMU) 140, a memory interface (I/F) 142, and a memory 144, all operatively coupled via an internal bus.

The host interface 132 may process commands and data provided from the host 102, and may communicate with the host 102 through at least one of various interface protocols such as universal serial bus (USB), multimedia card (MMC), peripheral component interconnect-express (PCI-e or PCIe), small computer system interface (SCSI), serial-attached SCSI (SAS), serial advanced technology attachment (SATA), parallel advanced technology attachment (PATA), small computer system interface (SCSI), enhanced small disk interface (ESDI) and integrated drive electronics (IDE). In accordance with an embodiment, the host interface unit 132 is a component for exchanging data with the host 102, which may be implemented through a firmware called a host interface layer (HIL).

The ECC unit 138 can correct error bits of the data to be processed in (e.g., outputted from) the memory device 150, which may include an ECC encoder and an ECC decoder. The ECC encoder can perform error correction encoding of data to be programmed in the memory device 150 to generate encoded data into which a parity bit is added and store the encoded data in memory device 150. The ECC decoder can detect and correct errors contained in a data read from the memory device 150 when the controller 130 reads the data stored in the memory device 150. That is, after performing error correction decoding on the data read from the memory device 150, the ECC unit 138 can determine whether the error correction decoding has succeeded, and output an instruction signal (e.g., a correction success signal or a correction fail signal). The ECC unit 138 can use the parity bit which is generated during the ECC encoding process, for correcting the error bit of the read data. When the number of the error bits is greater than or equal to a threshold number of correctable error bits, the ECC unit 138 may not correct error bits but may output an error correction fail signal indicating failure in correcting the error bits.

The ECC unit 138 may perform an error correction operation based on a coded modulation such as a low density parity check (LDPC) code, a Bose-Chaudhuri-Hocquenghem (BCH) code, a turbo code, a Reed-Solomon (RS) code, a convolution code, a recursive systematic code (RSC), a trellis-coded modulation (TCM), a Block coded modulation (BCM), and so on. The ECC unit 138 may include all or some of circuits, modules, systems or devices for performing the error correction operation based on at least one of the above described codes.

The PMU 140 may manage an electrical power provided in the controller 130.

The memory interface 142 may serve as an interface for handling commands and data transferred between the controller 130 and the memory device 150, to allow the controller 130 to control the memory device 150 in response to a request delivered from the host 102. The memory interface 142 may generate a control signal for the memory device 150 and may process data entered into or outputted from the memory device 150 under the control of the processor 134 in a case when the memory device 150 is a flash memory and, in particular, when the memory device 150 is a NAND flash memory. The memory interface unit 142 can provide an interface for handling commands and data between the controller 130 and the memory device 150, for example, operations of NAND flash interface, in particular, operations between the controller 130 and the memory device 150. In accordance with an embodiment, the memory interface unit 142 can be implemented through a firmware called a Flash Interface Layer (FIL) as a component for exchanging data with the memory device 150.

The memory 144 may support operations performed by the memory system 110 and the controller 130. The memory 144 may store temporary or transactional data occurred or delivered for operations in the memory system 110 and the controller 130. The controller 130 may control the memory device 150 in response to a request from the host 102. The controller 130 may deliver data read from the memory device 150 into the host 102. The controller 130 may store data entered through the host 102 within the memory device 150. The memory 144 may be used to store data required for the controller 130 and the memory device 150 to perform operations such as read operations or program/write operations.

The memory 144 may be implemented with a volatile memory. The memory 144 may be implemented with a static random access memory (SRAM), a dynamic random access memory (DRAM) or both. Although FIG. 1 exemplifies the second memory 144 disposed within the controller 130, the embodiment is not limited thereto. That is, the memory 144 may be located inside or outside the controller 130. For instance, the memory 144 may be embodied by an external volatile memory having a memory interface transferring data and/or signals transferred between the memory 144 and the controller 130.

The memory 144 can store data necessary for performing operations such as data writing and data reading requested by the host 102 and/or data transfer between the memory device 150 and the controller 130 for background operations such as garbage collection and wear levelling as described above. In accordance with an embodiment, for supporting operations in the memory system 110, the memory 144 may include a program memory, a data memory, a write buffer/cache, a read buffer/cache, a data buffer/cache, a map buffer/cache, and the like.

The processor 134 may be implemented with a microprocessor or a central processing unit (CPU). The memory system 110 may include one or more processors 134. The processor 134 may control the overall operations of the memory system 110. By way of example but not limitation, the processor 134 can control a program operation or a read operation of the memory device 150, in response to a write request or a read request entered from the host 102. In accordance with an embodiment, the processor 134 may use or execute firmware to control the overall operations of the memory system 110. Herein, the firmware may be referred to as a flash translation layer (FTL). The FTL may perform an operation as an interface between the host 102 and the memory device 150. The host 102 may transmit requests for write and read operations to the memory device 150 through the FTL.

The FTL may manage operations of address mapping, garbage collection, wear-leveling and so forth. Particularly, the FTL may load, generate, update, or store map data. Therefore, the controller 130 may map a logical address, which is entered from the host 102, with a physical address of the memory device 150 through the map data. The memory device 150 may look like a general storage device to perform a read or write operation because of the address mapping operation. Also, through the address mapping operation based on the map data, when the controller 130 tries to update data stored in a particular page, the controller 130 may program the updated data on another empty page and may invalidate old data of the particular page (e.g., update a physical address, corresponding to a logical address of the updated data, from the previous particular page to the newly programed page) due to a characteristic of a flash memory device. Further, the controller 130 may store map data of the new data into the FTL.

For example, for performing an operation requested from the host 102 in the memory device 150, the controller 130 uses the processor 134 implemented in a microprocessor or central processing unit (CPU) or the like. The processor 134 engaged with the memory device 150 can handle instructions or commands corresponding to an inputted command from the host 102. The controller 130 can perform a foreground operation as a command operation, corresponding to an command inputted from the host 102, such as a program operation corresponding to a write command, a read operation corresponding to a read command, an erase/discard operation corresponding to an erase/discard command, and a parameter set operation corresponding to a set parameter command or a set feature command with a set command.

For another example, the controller 130 may perform a background operation on the memory device 150 through the processor 134. By way of example but not limitation, the background operation for the memory device 150 includes an operation (e.g., a garbage collection (GC) operation) for copying and storing data stored in an arbitrary memory block among the memory blocks 152, 154, 156 in the memory device 150 to another arbitrary memory block. The background operation can include an operation (e.g., a wear leveling (WL) operation) to move or swap between data stored in at least one of the memory blocks 152, 154, 156 in memory device 150 and in at least another of the memory blocks 152, 154, 156. As the background operation, the controller 130 uses the processor 134 for storing the map data stored in the controller 130 to at least one of the memory blocks 152, 154, 156 in the memory device 150, e.g., a map flush operation. A bad block management operation for checking bad blocks in the plurality of memory blocks 152, 154, 156 included in the memory device 150 is one of other background operation examples performed by the processor 134.

In the memory system 110, the controller 130 performs a plurality of command operations corresponding to a plurality of commands entered from the host 102. For example, when performing a plurality of program operations corresponding to plural program commands, a plurality of read operations corresponding to plural read commands and a plurality of erase operations corresponding to plural erase commands sequentially, randomly or alternatively, the controller 130 can determine which channel(s) or way(s) in a plurality of channels (or ways) for connecting the controller 130 to a plurality of memory dies included in the memory device 150 is/are proper or appropriate for performing each operation. The controller 130 can send or transmit data or instructions via determined channels or ways for performing each operation. The plurality of memory dies included in the memory device 150 can transmit an operation result via the same channels or ways, respectively, after each operation is complete. Then, the controller 130 may transmit a response or an acknowledge signal to the host 102. In an embodiment, the controller 130 can check a status of each channel or each way. In response to a command entered from the host 102, the controller 130 may select at least one channel or way based on the status of each channel or each way so that instructions and/or operation results with data may be delivered via selected channel(s) or way(s).

By way of example but not limitation, the controller 130 can recognize statuses regarding a plurality of channels (or ways) associated with a plurality of memory dies included in the memory device 150. The controller 130 may determine each channel or each way as being one of a busy state, a ready state, an active state, an idle state, a normal state, and/or an abnormal state. The controller's determination of which channel or way an instruction (and/or a data) is delivered through can be associated with a physical block address, e.g., which die(s) the instruction (and/or the data) is delivered into. The controller 130 can refer to descriptors delivered from the memory device 150. The descriptors can include a block or page of parameters that describe something about the memory device 150, which is a data with a predetermined format or structure. For instance, the descriptors may include device descriptors, configuration descriptors, unit descriptors, and the like. The controller 130 can refer to, or use, the descriptors to determine which channel(s) or way(s) an instruction or a data is exchanged via.

A management unit (not shown) may be included in the processor 134. The management unit may perform bad block management of the memory device 150. The management unit may find bad memory blocks included in the memory device 150, which are in unsatisfactory condition for further use, as well as perform bad block management on the bad memory blocks. When the memory device 150 is a flash memory, for example, a NAND flash memory, a program failure may occur during the write operation, for example, during the program operation, due to characteristics of a NAND logic function. During the bad block management, the data of the program-failed memory block or the bad memory block may be programmed into a new memory block. The bad blocks may seriously aggravate the utilization efficiency of the memory device 150 having a 3D stack structure and the reliability of the memory system 110. Thus, reliable bad block management may enhance or improve performance of the memory system 110.

Figure 3:
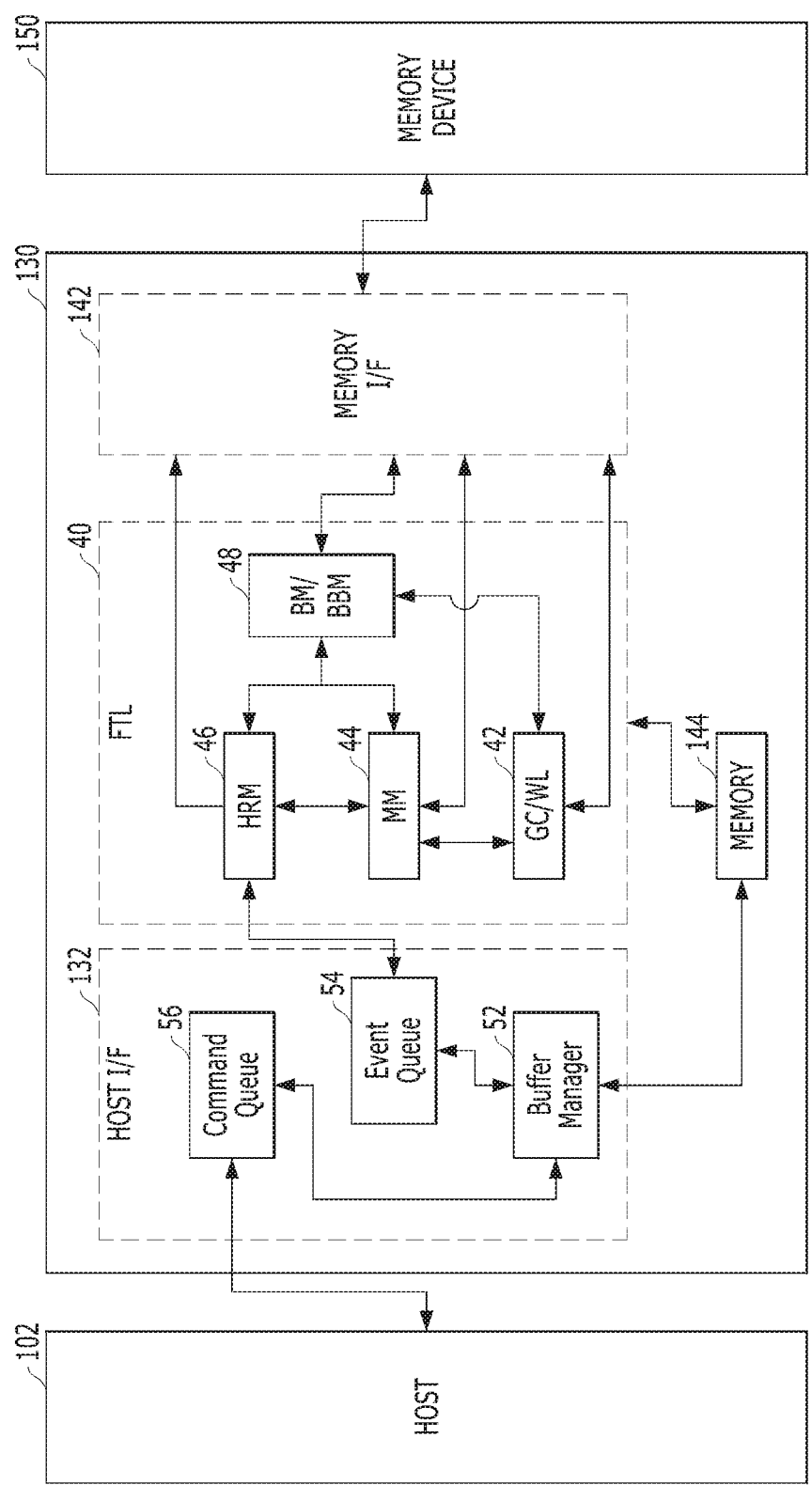
FIG. 3 is a block diagram illustrating a controller included in a memory system in accordance with an embodiment of the disclosure.

Referring to FIG. 3, a controller in a memory system in accordance with another embodiment of the disclosure is described in detail. The controller 130 cooperates with the host 102 and the memory device 150. The controller 130 can include a host interface unit 132, a flash translation layer (FTL) unit 40, a memory interface unit 142, and a memory 144.

Although not shown in FIG. 3, in accordance with an embodiment, the ECC unit 138 described in FIG. 2 may be included in the flash translation layer (FTL) unit 40. In another embodiment, the ECC unit 138 may be implemented as a separate module, a circuit, a firmware or the like, which is included in, or associated with, the controller 130.

The host interface unit 132 is for handling commands, data, and the like transmitted from the host 102. By way of example but not limitation, the host interface unit 132 can include a command queue 56, a buffer manager 52, and an event queue 54. The command queue 56 can sequentially store commands, data, and the like transmitted from the host 102 and output them to the buffer manager 52 in a stored order. The buffer manager 52 can classify, manage, or adjust the commands, the data, and the like, which are delivered from the command queue 56. The event queue 54 can sequentially transmit events for processing the commands, the data, and the like transmitted from the buffer manager 52.

A plurality of commands or data of the same characteristic may be continuously transmitted from the host 102, or commands and data of different characteristics may be transmitted to the memory system 110 after being mixed or jumbled. For example, a plurality of commands for reading data (read commands) may be delivered, or commands for reading data (read command) and programming/writing data (write command) may be alternately transmitted to the memory system 110. The host interface unit 132 can store commands, data, and the like, which are transmitted from the host 102, to the command queue 56 sequentially. Thereafter, the host interface unit 132 can estimate or predict what kind of operation the controller 130 will perform according to the characteristics of the command, data, etc., which is transmitted from the host 102. The host interface unit 132 can determine a processing order and a priority of commands, data and the like, based at least on their characteristics. According to characteristics of commands, data, and the like transmitted from the host 102, the buffer manager 52 in the host interface unit 132 is configured to determine whether to store commands, data, and the like in the memory 144, or whether to deliver the commands, the data, and the like into the flash translation layer (FTL) unit 40. The event queue 54 receives events, entered from the buffer manager 52, which are to be internally executed and processed by the memory system 110 or the controller 130 in response to the commands, the data, etc. transmitted from the host 102, so as to deliver the events into the flash translation layer (FTL) unit 40 in the order received.

In accordance with an embodiment, the host interface unit 132 described in FIG. 3 may perform the functions of the controller 130 described in FIG. 1. The host interface unit 132 may set the first memory 104 included in the host 102 as a slave and add the first memory 104 as an additional storage space which is controllable or usable by the controller 130.

In accordance with an embodiment, the flash translation layer (FTL) unit 40 can include a host request manager (HRM) 46, a map manager (MM) 44, a state manager 42, and a block manager 48. The host request manager (HRM) 46 can manage the events entered from the event queue 54. The map manager (MM) 44 can handle or control a map data. The state manager 42 can perform garbage collection or wear leveling. The block manager 48 can execute commands or instructions onto a block in the memory device 150.

By way of example but not limitation, the host request manager (HRM) 46 can use the map manager (MM) 44 and the block manager 48 to handle or process requests according to the read and program commands and events which are delivered from the host interface unit 132. The host request manager (HRM) 46 can send an inquiry request to the map data manager (MM) 44, to figure out a physical address corresponding to the logical address which is entered with the events. The host request manager (HRM) 46 can send a read request with the physical address to the memory interface unit 142, to process the read request (handle the events). Furthermore, the host request manager (HRM) 46 can send a program request (write request) to the block manager 48, to program entered data to a specific page of the unrecorded (no data) in the memory device 150, and then, can transmit a map update request corresponding to the program request to the map manager (MM) 44, to update an item relevant to the programmed data in information for mapping the logical-to-physical addresses to each other.

The block manager 48 can convert a program request delivered from the host request manager (HRM) 46, the map data manager (MM) 44, and/or the state manager 42 into a flash program request used for the memory device 150, to manage flash blocks in the memory device 150. In order to maximize or enhance program or write performance of the memory system 110 (see FIG. 2), the block manager 48 may collect program requests and send flash program requests for multiple-plane and one-shot program operations to the memory interface unit 142. The block manager 48 may send several flash program requests to the memory interface unit 142 to enhance or maximize parallel processing of the multi-channel and multi-directional flash controller.

Moreover, the block manager 48 can be configured to manage blocks in the memory device 150 according to the number of valid pages, select and erase blocks having no valid pages when a free block is needed, and select a block including the least valid page when it is determined that garbage collection is necessary. The state manager 42 can perform garbage collection to move the valid data to an empty block and erase the blocks containing the moved valid data so that the block manager 48 may have enough free blocks (empty blocks with no data). If the block manager 48 provides information regarding a block to be erased to the state manager 42, the state manager 42 could check all flash pages of the block to be erased to determine whether each page is valid. For example, to determine validity of each page, the state manager 42 can identify a logical address recorded in an out-of-band (OOB) area of each page. To determine whether each page is valid, the state manager 42 can compare the physical address of the page with the physical address mapped to the logical address obtained from the inquiry request. The state manager 42 sends a program request to the block manager 48 for each valid page. A mapping table can be updated through an update of the map manager 44 when the program operation is complete.

The map manager 44 can manage a logical-to-physical mapping table. The map manager 44 can process requests such as queries, updates, and the like, which are generated by the host request manager (FIRM) 46 or the state manager 42. The map manager 44 may store the entire mapping table in the memory device 150 (e.g., a flash/non-volatile memory) and cache mapping entries according to the storage capacity of the memory 144. When a map cache miss occurs while processing inquiry or update requests, the map manager 44 may send a read request to the memory interface unit 142 to load a relevant mapping table stored in the memory device 150. When the number of dirty cache blocks in the map manager 44 exceeds a certain threshold, a program request can be sent to the block manager 48 so that a clean cache block is made and the dirty map table may be stored in the memory device 150.

When garbage collection is performed, the state manager 42 copies valid page(s) into a free block, and the host request manager (HRM) 46 can program the latest version of the data for the same logical address of the page and currently issue an update request. When the status manager 42 requests the map update in a state in which copying of valid page(s) is not completed normally, the map manager 44 may not perform the mapping table update. This is because the map request is issued with old physical information if the status manger 42 requests a map update and a valid page copy is completed later. The map manager 44 may perform a map update operation to ensure accuracy only if the latest map table still points to the old physical address.

The memory device 150 can include a plurality of memory blocks. The plurality of memory blocks can be classified into different types of memory blocks such as a single level cell (SLC) memory block, a multi level cell (MLC) Cell) memory block or the like, according to the number of bits that can be stored or represented in one memory cell. Here, the SLC memory block includes a plurality of pages implemented by memory cells, each storing one bit of data. The SLC memory block can have high data I/O operation performance and high durability. The MLC memory block includes a plurality of pages implemented by memory cells, each storing multi-bit data (e.g., two bits or more). The MLC memory block can have larger storage capacity in the same space than the SLC memory block. The MLC memory block can be highly integrated in a view of storage capacity. In an embodiment, the memory device 150 may be implemented with MLC memory blocks such as an MLC memory block, a triple level cell (TLC) memory block, a quadruple level cell (QLC) memory block or any combination thereof. The MLC memory block may include a plurality of pages implemented by memory cells, each capable of storing 2-bit data. The triple level cell (TLC) memory block can include a plurality of pages implemented by memory cells, each capable of storing 3-bit data. The quadruple level cell (QLC) memory block can include a plurality of pages implemented by memory cells, each capable of storing 4-bit data. In another embodiment, the memory device 150 can be implemented with a block including a plurality of pages implemented by memory cells, each capable of storing 5-bit or more bit data.

In an embodiment of the disclosure, the memory device 150 is embodied as a nonvolatile memory such as a flash memory such as a NAND flash memory, a NOR flash memory and the like. But, the memory device 150 may be implemented by at least one of a phase change random access memory (PCRAM), a ferroelectrics random access memory (FRAM), a spin injection magnetic memory (STT-RAM), and a spin transfer torque magnetic random access memory (STT-MRAM), or the like.

Figure 4:
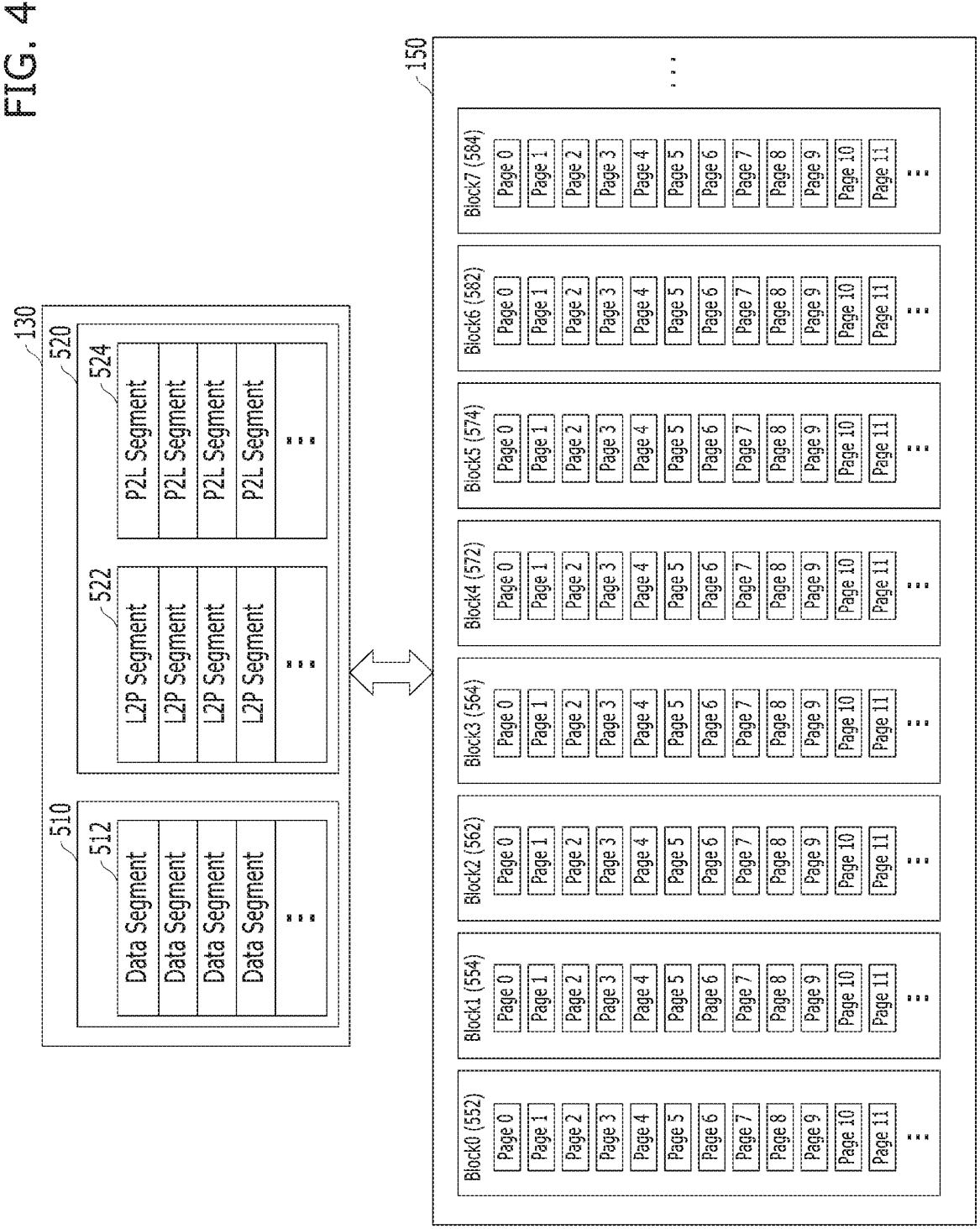
FIGS. 4 and 5 are diagrams illustrating a memory system in accordance with an embodiment of the disclosure which performs a plurality of command operations.
Figure 5:
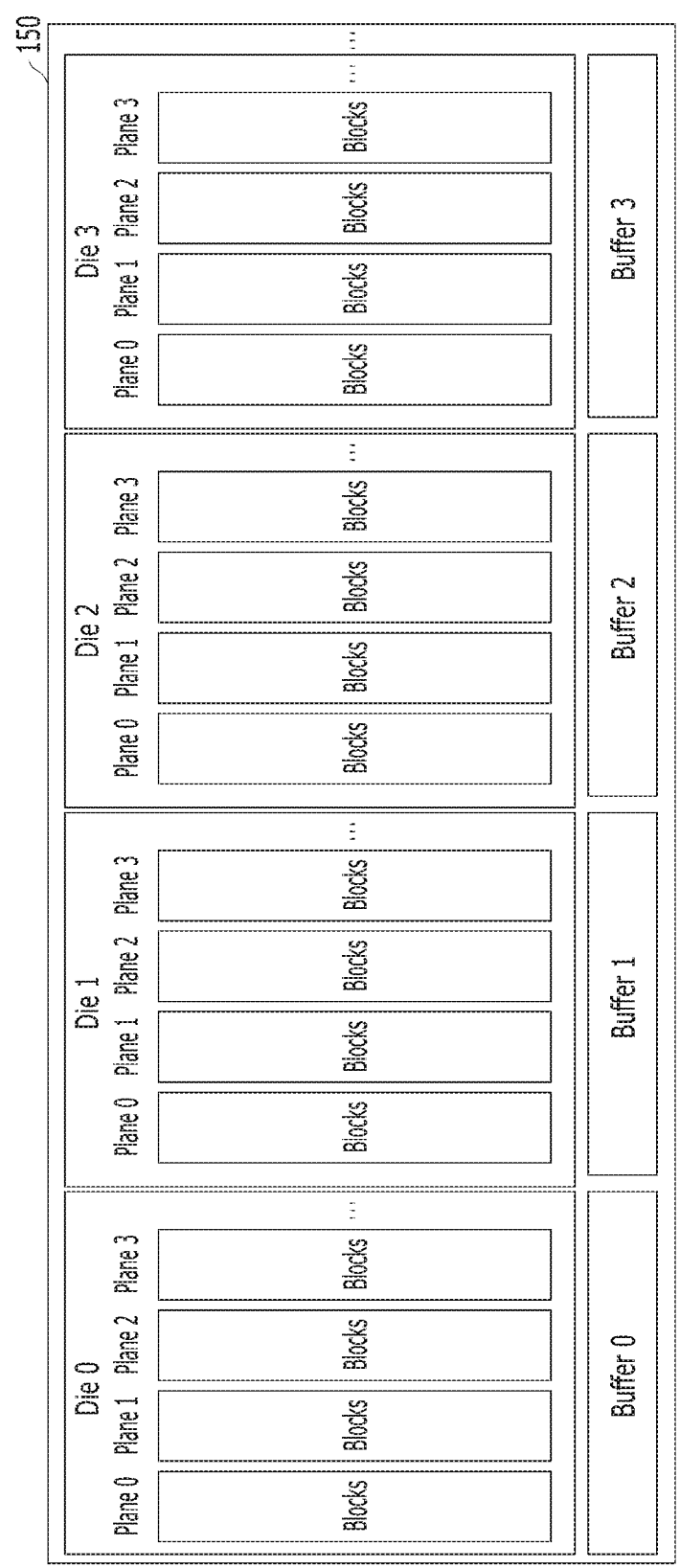

FIGS. 4 and 5 schematically describe performing a plurality of command operations corresponding to a plurality of commands in the memory system in accordance with an embodiment of the disclosure. For example, in the embodiment of the disclosure, detailed descriptions will be made for a data processing operation in a case where a plurality of write commands are received from the host 102 and program operations corresponding to the write commands are performed, in another case where a plurality of read commands are received from the host 102 and read operations corresponding to the read commands are performed, in another case where a plurality of erase commands are received from the host 102 and erase operations corresponding to the erase commands are performed, or in another case where a plurality of write commands and a plurality of read commands are received together from the host 102 and program operations and read operations corresponding to the write commands and the read commands are performed.

Moreover, in the embodiment of the disclosure, descriptions will be made by taking as an example a case where: write data corresponding to a plurality of write commands entered from the host 102 are stored in the buffer/cache included in the memory 144 of the controller 130, the write data stored in the buffer/cache are programmed to and stored in the plurality of memory blocks included in the memory device 150, map data corresponding to the stored write data in the plurality of memory blocks are updated, and the updated map data are stored in the plurality of memory blocks included in the memory device 150. In the embodiment of the disclosure, descriptions will be made for a case where program operations corresponding to a plurality of write commands entered from the host 102 are performed. Furthermore, in the embodiment of the disclosure, descriptions will be made for a case where: a plurality of read commands are entered from the host 102 for the data stored in the memory device 150, data corresponding to the read commands are read from the memory device 150 by checking the map data of the data corresponding to the read commands, the read data are stored in the buffer/cache included in the memory 144 of the controller 130, and the data stored in the buffer/cache are provided to the host 102. That is, in the embodiment of the disclosure, descriptions will be made for a case where read operations corresponding to a plurality of read commands entered from the host 102 are performed. In addition, in the embodiment of the disclosure, descriptions will be made for a case where: a plurality of erase commands are received from the host 102 for the memory blocks included in the memory device 150, memory blocks are checked corresponding to the erase commands, the data stored in the checked memory blocks are erased, map data corresponding to the erased data are updated, and the updated map data are stored in the plurality of memory blocks included in the memory device 150. Namely, in the embodiment of the disclosure, descriptions will be made for a case where erase operations corresponding to a plurality of erase commands received from the host 102 are performed.

Further, while, in the embodiment of the disclosure, it will be described that the controller 130 performs command operations in the memory system 110, it is to be noted that, as described above, the processor 134 included in the controller 130 may perform command operations in the memory system 110, through, for example, an FTL (flash translation layer). Also, in the embodiment of the disclosure, the controller 130 programs and stores user data and metadata corresponding to write commands entered from the host 102, in arbitrary memory blocks among the plurality of memory blocks included in the memory device 150, reads user data and metadata corresponding to read commands received from the host 102, from arbitrary memory blocks among the plurality of memory blocks included in the memory device 150, and provides the read data to the host 102, or erases user data and metadata, corresponding to erase commands entered from the host 102, from arbitrary memory blocks among the plurality of memory blocks included in the memory device 150.

Metadata may include first map data including a logical/physical (L2P: logical to physical) information (hereinafter, referred to as a 'logical information') and second map data including a physical/logical (P2L: physical to logical) information (hereinafter, referred to as a 'physical information'), for data stored in memory blocks corresponding to a program operation. Also, the metadata may include an information for command data corresponding to a command received from the host 102, an information for a command operation corresponding to the command, an information for the memory blocks of the memory device 150 for which the command operation is to be performed, and an information for map data corresponding to the command operation. Namely, metadata may include all remaining information and data excluding user data corresponding to a command received from the host 102.

That is, in the embodiment of the disclosure, in the case where: the controller 130 receives a plurality of write commands from the host 102, program operations corresponding to the write commands are performed, and user data corresponding to the write commands are written and stored in empty memory blocks, open memory blocks or free memory blocks for which an erase operation has been performed of the memory device 150. Also, first map data, including an L2P map table or an L2P map list in which logical information as the mapping information between logical addresses and physical addresses for the user data stored in the memory blocks are recorded, and second map data, including a P2L map table or a P2L map list in which physical information as the mapping information between physical addresses and logical addresses for the memory blocks stored with the user data are recorded, are written and stored in empty memory blocks, open memory blocks or free memory blocks of the memory device 150.

When write commands are entered from the host 102, the controller 130 writes and stores user data corresponding to the write commands in memory blocks. The controller 130 stores, in other memory blocks, metadata including first map data and second map data for the user data stored in the memory blocks. Particularly, corresponding to the data segments of the user data are stored in the memory blocks of the memory device 150, the controller 130 generates and updates the L2P segments of first map data and the P2L segments of second map data as the map segments of map data. The controller 130 stores the map segments in the memory blocks of the memory device 150. The map segments stored in the memory blocks of the memory device 150 are loaded in the memory 144 included in the controller 130 and are then updated.

Further, when a plurality of read commands are received from the host 102, the controller 130 reads read data corresponding to the read commands, from the memory device 150, stores the read data in the buffers/caches included in the memory 144 of the controller 130. The controller 130 provides the data stored in the buffers/caches, to the host 102, by which read operations corresponding to the plurality of read commands are performed.

In addition, when a plurality of erase commands are received from the host 102, the controller 130 checks memory blocks of the memory device 150 corresponding to the erase commands, and then, performs erase operations for the memory blocks.

When command operations corresponding to the plurality of commands received from the host 102 are performed while a background operation is performed, the controller 130 loads and stores data corresponding to the background operation, that is, metadata and user data, in the buffer/cache included in the memory 144 of the controller 130, and then stores the data, that is, the metadata and the user data, in the memory device 150. By way of example but not limitation, the background operation may include a garbage collection operation or a read reclaim operation as a copy operation, a wear leveling operation as a swap operation or a map flush operation. For instance, for the background operation, the controller 130 may check metadata and user data corresponding to the background operation, in the memory blocks of the memory device 150, load and store the metadata and user data stored in certain memory blocks of the memory device 150, in the buffer/cache included in the memory 144 of the controller 130, and then store the metadata and user data, in certain other memory blocks of the memory device 150.

In the memory system in accordance with an embodiment of the disclosure, when performing command operations as foreground operations and a copy operation, a swap operation and a map flush operation as background operations, the controller 130 schedules queues corresponding to the foreground operations and the background operations and allocates the scheduled queues to the memory 144 included in the controller 130 and the memory included in the host 102. In this regard, the controller 130 assigns identifiers (IDs) by respective operations for the foreground operations and the background operations to be performed in the memory device 150, and schedules queues corresponding to the operations assigned with the identifiers, respectively. In the memory system in accordance with the embodiment of the disclosure, identifiers are assigned not only by respective operations for the memory device 150 but also by functions for the memory device 150, and the queues corresponding to the functions assigned with respective identifiers are scheduled.

In the memory system in accordance with the embodiment of the disclosure, the controller 130 manages the queues scheduled by the identifiers of respective functions and operations to be performed in the memory device 150. The controller 130 manages the queues scheduled by the identifiers of a foreground operation and a background operation to be performed in the memory device 150. In the memory system in accordance with the embodiment of the disclosure, after memory regions corresponding to the queues scheduled by identifiers are allocated to the memory 144 included in the controller 130 and the memory included in the host 102, the controller 130 manages addresses for the allocated memory regions. The controller 130 performs not only the foreground operation and the background operation but also respective functions and operations in the memory device 150, by using the scheduled queues.

Referring to FIG. 4, the controller 130 performs command operations corresponding to a plurality of commands entered from the host 102, for example, program operations corresponding to a plurality of write commands entered from the host 102. At this time, the controller 130 programs and stores user data corresponding to the write commands, in memory blocks of the memory device 150. Also, corresponding to the program operations with respect to the memory blocks, the controller 130 generates and updates metadata for the user data and stores the metadata in the memory blocks of the memory device 150.

The controller 130 generates and updates first map data and second map data which include information indicating that the user data are stored in pages included in the memory blocks of the memory device 150. That is, the controller 130 generates and updates L2P segments as the logical segments of the first map data and PH segments as the physical segments of the second map data, and then stores the L2P and P2L segments in pages included in the memory blocks of the memory device 150.

For example, the controller 130 caches and buffers the user data corresponding to the write commands entered from the host 102, in a first buffer 510 included in the memory 144 of the controller 130. Particularly, after storing data segments 512 of the user data in the first buffer 510 worked as a data buffer/cache, the controller 130 stores the data segments 512 stored in the first buffer 510 in pages included in the memory blocks of the memory device 150. As the data segments 512 of the user data corresponding to the write commands received from the host 102 are programmed to and stored in the pages included in the memory blocks of the memory device 150, the controller 130 generates and updates the first map data and the second map data. The controller 130 stores the first and second map data in a second buffer 520 included in the memory 144 of the controller 130. Particularly, the controller 130 stores L2P segments 522 of the first map data and P2L segments 524 of the second map data for the user data, in the second buffer 520 as a map buffer/cache. As described above, the L2P segments 522 of the first map data and the P2L segments 524 of the second map data may be stored in the second buffer 520 of the memory 144 in the controller 130. A map list for the L2P segments 522 of the first map data and another map list for the P2L segments 524 of the second map data may be stored in the second buffer 520. The controller 130 stores the L2P segments 522 of the first map data and the P2L segments 524 of the second map data, which are stored in the second buffer 520, in pages included in the memory blocks of the memory device 150.

Moreover, the controller 130 performs command operations corresponding to a plurality of commands received from the host 102, for example, read operations corresponding to a plurality of read commands received from the host 102. Particularly, the controller 130 loads L2P segments 522 of first map data and P2L segments 524 of second map data as the map segments of user data corresponding to the read commands, in the second buffer 520, and checks the L2P segments 522 and the P2L segments 524. Then, the controller 130 reads the user data stored in pages of corresponding memory blocks among the memory blocks of the memory device 150, stores data segments 512 of the read user data in the first buffer 510, and then provides the data segments 512 to the host 102.

Furthermore, the controller 130 performs command operations corresponding to a plurality of commands entered from the host 102, for example, erase operations corresponding to a plurality of erase commands entered from the host 102. In particular, the controller 130 checks memory blocks corresponding to the erase commands of the memory device 150 to carry out the erase operations for the checked memory blocks.

When performing an operation of copying data or swapping data among the memory blocks included in the memory device 150, for example, a garbage collection operation, a read reclaim operation or a wear leveling operation, as a background operation, the controller 130 stores data segments 512 of corresponding user data, in the first buffer 510, loads map segments 522, 524 of map data corresponding to the user data, in the second buffer 520, and then performs the garbage collection operation, the read reclaim operation, or the wear leveling operation. When performing a map update operation and a map flush operation for metadata, e.g., map data, for the memory blocks of the memory device 150 as a background operation, the controller 130 loads the corresponding map segments 522, 524 in the second buffer 520, and then performs the map update operation and the map flush operation.

When performing functions and operations including a foreground operation and a background operation for the memory device 150, the controller 130 assigns identifiers by the functions and operations to be performed for the memory device 150. The controller 130 schedules queues respectively corresponding to the functions and operations assigned with the identifiers, respectively. The controller 130 allocates memory regions corresponding to the respective queues, to the memory 144 included in the controller 130 and the memory included in the host 102. The controller 130 manages the identifiers assigned to the respective functions and operations, the queues scheduled for the respective identifiers and the memory regions allocated to the memory 144 of the controller 130, and the memory of the host 102 corresponding to the queues, respectively. The controller 130 performs the functions and operations for the memory device 150, through the memory regions allocated to the memory 144 of the controller 130 and the memory of the host 102.

Referring to FIG. 5, the memory device 150 includes a plurality of memory dies, for example, a memory die 0, a memory die 1, a memory die 2 and a memory die 3, and each of the memory dies includes a plurality of planes, for example, a plane 0, a plane 1, a plane 2 and a plane 3. The respective planes in the memory dies included in the memory device 150 each include a plurality of memory blocks, for example, N number of blocks Block0, Block1, . . . , BlockN−1 each block including a plurality of pages, for example, 2M number of pages, as described above with reference to FIG. 3. Moreover, the memory device 150 includes a plurality of buffers corresponding to the respective memory dies, for example, a buffer 0 corresponding to the memory die 0, a buffer 1 corresponding to the memory die 1, a buffer 2 corresponding to the memory die 2 and a buffer 3 corresponding to the memory die 3.

When performing command operations corresponding to a plurality of commands received from the host 102, data corresponding to the command operations are stored in the buffers included in the memory device 150. For example, when performing program operations, data corresponding to the program operations are stored in the buffers, and are then stored in the pages included in the memory blocks of the memory dies. When performing read operations, data corresponding to the read operations are read from the pages included in the memory blocks of the memory dies, are stored in the buffers, and are then provided to the host 102 through the controller 130.

In an embodiment of the disclosure, the buffers included in the memory device 150 exist outside the respective corresponding memory dies, however, it is to be noted that the buffers may exist inside the respective corresponding memory dies, and it is to be noted that the buffers may correspond to the respective planes or the respective memory blocks in the respective memory dies. Further, in the embodiment of the disclosure, the buffers included in the memory device 150 are the plurality of page buffers 322, 324 and 326 included in the memory device 150 as described above with reference to FIG. 3, however, it is to be noted that the buffers may be a plurality of caches or a plurality of registers included in the memory device 150.

Additionally, the plurality of memory blocks included in the memory device 150 may be grouped into a plurality of super memory blocks, and command operations may be performed in the plurality of super memory blocks. Each of the super memory blocks may include a plurality of memory blocks, for example, memory blocks included in a first memory block group and a second memory block group. In this regard, when the first memory block group is included in the first plane of a certain first memory die, the second memory block group may be included in the first plane of the first memory die, be included in the second plane of the first memory die or be included in the planes of a second memory die.

In an embodiment of the disclosure, a data processing system may include plural memory systems. Each of the plural memory systems 110 can include the controller 130 and the memory device 150. In the data processing system, one of the plural memory systems 110 can be a master and the others can be a slave. The master may be determined based on contention between the plural memory systems 110. When a plurality of commands is delivered from the host 102 in the data processing system, the master can determine a destination of each command based at least on statuses of channels or buses. For example, a first memory system can be determined as a master memory system among a plurality of memory systems, corresponding to information delivered from the plurality of memory systems. If the first memory system is determined as the master memory system, the remaining memory systems are considered slave memory systems. A controller of the master memory system can check statuses of a plurality of channels (or ways, buses) coupled to a plurality of memory systems, to select which memory system handles commands or data delivered from the host 102. In an embodiment, a master can be dynamically determined among the plural memory systems. In another embodiment, a master memory system may be changed with one of other slave memory systems periodically or according to an event.

Hereinafter, a method and apparatus for transferring data in the memory system 110 including the memory system 150 and the controller 130 described above will be described in more detail. As the amount of data stored in the memory system 110 becomes larger, the memory system 110 may be required to read or store large amounts of data at a time. However, a read time for reading a data stored in the memory device 150 or a program/write time for writing a data in the memory device 150 may be generally longer than a handling time for the controller 130 to process a data or a data transmission time between the controller 130 and the memory system 150. For example, the read time might be twice of the handling time. Since the read time or the program time is relatively far longer than the handling time or the data transmission time, a procedure or a process for delivering data in the memory system 110 may affect performance of the memory system 110, e.g., an operation speed, and/or structure of the memory system 110 such as a buffer size.

Figure 6:
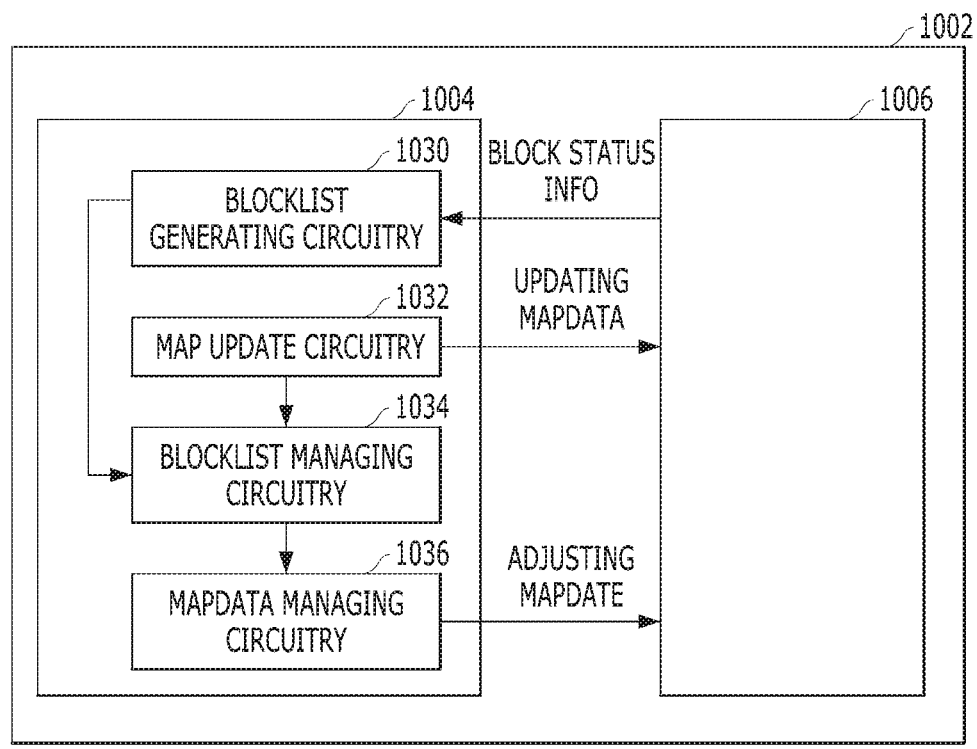
FIG. 6 is a block diagram illustrating a memory system in accordance with another embodiment of the disclosure.

FIG. 6 illustrates a memory system 1002 in accordance with another embodiment of the disclosure. As shown, the memory system 1002 can include a controller 1004 and a memory device 1006.

Referring to FIG. 6, the memory device 1006 can include plural blocks capable of storing data. The controller 1004 can include a blocklist generating circuitry 1030, a map update circuitry 1032, a blocklist managing circuitry 1034 and a map data managing circuitry 1036.

The blocklist generating circuitry 1030 in the controller 1004 can access and gather block information of the memory device 1006. By way of example, the block information can include valid page counts regarding each block or a predetermined range of blocks. The blocklist generating circuitry 1030 can generate the blocklist regarding plural blocks based on the valid page counts entered from the memory device 1006. For example, the blocklist generating circuitry 1030 can select blocks which are accessed last as target blocks included in the blacklist. The target block included in the blacklist is in a closed status so that a new data cannot be programmed without an erase operation to data which is stored therein. At the timing when a block is closed, the controller 1004 can determine a valid page count of the block and store the valid page count as the block information in the memory device 1006.

When the controller 1004 programs a data into the memory device 1006, the map update circuitry 1032 can generate or update a map data corresponding to the programmed data. After generating or updating the map data, the map update circuitry 1032 can notify the blacklist managing circuitry 1034 of the generation or update of the map data. For example, when the controller 1004 receives a command entered from the host and performs a program operation in response to the command, the map update circuitry 1032 can update a map data changed by the program operation. Among generated map data, there may be map data which occurred when new data is programmed, and which corresponds to a new logical address, and another map data which occurred when data stored in the memory device is updated and programmed to a new location which is allocated for the existing logical address.

The blocklist managing circuitry 1034 can monitor the amount of change in a valid page count (i.e., the number of valid pages) for each block included in the blacklist transmitted from the blocklist generating circuitry 1030 in response to the notification from the map update circuitry 1032. For example, if the map update circuitry 1032 updates the map in response to a program operation, the valid page count for at least one block included in the blocklist generated by the blocklist generating circuitry 1030 may be changed. Therefore, the blocklist managing circuitry 1034 needs to check the updated valid page count of the target block included in the block list. Accordingly, the blocklist managing circuitry 1034 can recognize the change of valid page count for the block included in the blacklist, and sort or arrange the blocks included in the blacklist according to the change of valid page count.

When the blocklist managing circuitry 1034 determines that the change of valid page count for the target block in the blocklist is greater than the predetermined threshold, the blocklist managing circuitry 1034 notifies the map data managing circuitry 1036 that it is necessary to clean up the map data corresponding to the data stored in the corresponding block. A large change in the valid page count for a specific block may show that a significant number of the data stored in that block is no longer valid. The blocklist managing circuitry 1034 can determine that block to be a target block for cleaning up map data.

The map data managing circuitry 1036 can identify the duplicated map data corresponding to data that is stored in a specific block but is no longer valid. The map data managing circuitry 1036 can delete or invalidate the duplicated map data. In an embodiment, the map data obtained by the map update circuitry 1032 can be compared with the map data regarding at least one block to be targeted by the blocklist managing circuitry 1034 to clean up or delete the duplicated map data. For example, when the two map data described above are compared with each other and are the duplicates of each other, the older one of the duplicated map data can be deleted or erased.

In accordance with an embodiment, the map data cleanup operation performed by the map data managing circuitry 1036 on the target block designated by the blocklist managing circuitry 1034 may be performed a predetermined time after a program operation is done. For example, after designating a block in the blocklist managing circuitry 1034, the controller 1004 can perform an operation such as a program, a read, and an erase. Then, the controller 1004 can determine a target block and clean up the map data for the target block in an idle time or in a predetermined time which passed from the operation.

As used in the disclosure, the term 'circuitry' can refer to all of the following: (a) hardware-only circuit implementations (such as implementations in only analog and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and (c) to circuits, such as a microprocessor(s) or a portion of a microprocessor(s), that require software or firmware for operation, even if the software or firmware is not physically present. This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to a particular claim element, an integrated circuit for a storage device.

FIG. 7A is a blocklist in accordance with an embodiment of the disclosure.

Referring to FIG. 7A, a first block list BL_A shows valid page counts VPC regarding plural blocks xBLK1, xBLK2, xBLK3, xBLK4, xBLK5 selected as the target block. In FIG. 7A, the valid page counts VPC of each block xBLK1, xBLK2, xBLK3, xBLK4, xBLK5 are 100, 90, 50, 100, and 70, respectively.

The controller 1004 can recognize the valid page counts of each block xBLK1, xBLK2, xBLK3, xBLK4, xBLK5. The controller 1004 may include the valid page counts in the blocklist before the update of the map data. Then the controller 1004 can update the map data after performing at least one operation such as a program operation or an erase operation. The controller 1004 may compare the previous valid page count with the updated valid page count after the update is done.

In accordance with an embodiment, the controller 1004 generates a blocklist such as the first blocklist BL_A before performing the operation of updating a map data corresponding to data programmed in the memory device 1006. This blocklist can be stored in the memory of the controller 1004.

As in the first block list BL_A shown in FIG. 7A, the controller 1004 can generate a blocklist including valid page counts for five blocks selected as the target block. In accordance with an embodiment, the controller 1004 can determine the target block included in the blocklist in various ways, as well as determine the different number of target blocks included in the blocklist. For example, the controller 1004 may generate a blocklist including valid page counts for three blocks selected as a target block. In another example, the controller 1004 may monitor valid page counts for ten blocks selected as the target block. The number of target blocks can be determined when a blocklist is generated.

FIG. 7B illustrates an example of a blocklist in accordance with another embodiment of the disclosure. As shown, a second blocklist BL_B indicates valid page counts VPC, updated valid page counts UPDATED VPC and the changes of valid page counts CH_VPC for each block xBLK1, xBLK2, xBLK3, xBLK4, xBLK5 selected as a target block.

The second blocklist BL_B of FIG. 7B can be generated after the controller 1004 programs a data in the memory device 1006, after the first block list BL_A of FIG. 7A is generated, so that the map data corresponding to the programmed data is updated. Thus, block information BLOCK included in the first blocklist BL_A is reflected into the second block list BL_B.

The valid page count VPC regarding a block selected as a target block in the second blocklist BL_B of FIG. 7B is the same as the first blocklist BL_A of FIG. 7A. The updated valid page count VPC in the second blacklist BL_B is the valid page count of each block, which is determined after the map data for each of the blocks xBLK1, xBLK2, xBLK3, xBLK4, xBLK5 selected as the target blocks are updated. The change of valid page count CH_VPC included in the second blocklist BL_B can be a difference between the previous valid page count and the updated valid page count.

Referring to FIG. 7B, the valid page count for each block xBLK1, xBLK2, xBLK3, xBLK4, xBLK5 before the update of the map data is 100, 90, 50, 100, and 70, respectively. The updated valid page count of each block xBLK1, xBLK2, xBLK3, xBLK4, xBLK5 is 50, 80, 20, 100, and 30, respectively. After the map data is updated, the change of valid page count regarding each of the blocks xBLK1, xBLK2, xBLK3, xBLK4, xBLK5 are 50, 10, 30, 0, and 40, respectively.

In accordance with an embodiment, blocks of the second blocklist BL_B can be sorted in the order of a larger difference between the previous valid page count and the updated valid page count. For example, even if the controller 1004 arranges plural blocks based on the valid page counts in an arbitrary order in the first blocklist BL_A without any special rule, blocks in the second blocklist are arranged in the order of a larger difference. Referring to FIG. 7B, the order of the first block xBLK1, the fifth block xBLK5, the third block xBLK3, the second block xBLK2, and the fourth block xBLK4 can be arranged in the second blocklist BL_B. The change of valid page count CH_VPC for each block may be 50, 40, 30, 10 and 0, respectively. In the case of the first block xBLK1 having the largest change of valid page count, a large number of data programmed in the first block is no longer valid after the map data is updated. On the other hand, in the case of the fourth block xBLK4 having no change of valid page count, the update of the map data does not affect the data stored in the fourth block xBLK4, indicating that the previously valid data can be still valid.

In accordance with an embodiment of the disclosure, map data of a block having the largest amount of change in the valid page count in the blocklist can be cleaned up. For example, map data of the first block xBLK1, which is the block having the largest change of valid page count among the blocks selected as the target blocks in the second blocklist BL_B, can be cleaned up. In accordance with another embodiment, map data of at least one block whose change of valid page count in the block list is equal to or greater than a predetermined threshold can be cleaned up. For example, when the predetermined threshold is 20, map data regarding the first block xBLK1, the fifth block xBLK5, and the third block xBLK3, which are blocks having the change of valid page count CH_VPC of 20 or more in the second blocklist BL_B can be cleaned up.

Figure 8:
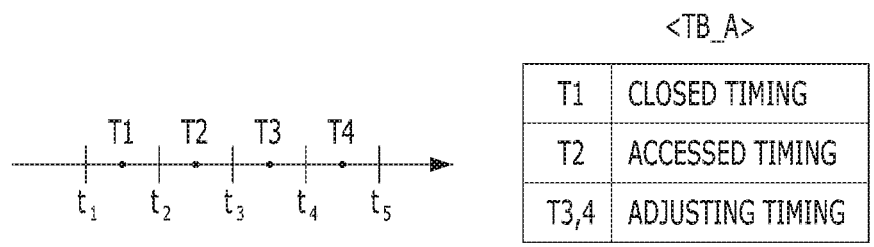
FIG. 8 is a diagram illustrating a timing of generating a blocklist in accordance with an embodiment of the disclosure.

FIG. 8 illustrates timing of generating a blocklist in accordance with an embodiment of the disclosure. Specifically, FIG. 8 shows operations that can occur in a block based on a time. In FIG. 8, an x-axis is a time, which includes plural timings t1, t2, t3, t4, t5. The operations can be executed on the block before, after, at or between the plural timings t1, t2, t3, t4, t5.

At least one of t1, t2, t3, t4, and t5 may be a timing when the operation of updating the map data is performed. For example, at least one of t1, t2, t3, t4, and t5 is a time point at which the map data is updated in the memory device 1006 (see FIG. 1) after the controller 1004 performs a program operation. In FIG. 8, a time spent on the operation of updating the map data is very short and can be expressed as a single timing of t1, t2, t3, t4 or t5.

For example, a first section T1 may be a time slot between first and second timings t1, t2. A specific block can be closed at the first section T1. A second section T2 may be a time period between second and third timings t2, t3. In the second section T2, the controller can monitor which block may be accessed and determine which block is last accessed. A third section may be a time phase between third and fourth timings t3, t4. In the third section, a map data regarding a target block is not updated yet. A fourth section T4 may be a time span between fourth and fifth timings t4, t5. In the fourth section T4, the map data regarding the target block is updated in response to an operation. The controller 1004 can check or recognize a valid page count regarding at least one block of the memory device 1006 in the first to fifth sections T1, T2, T3, T4, T5.

In an embodiment of the disclosure, the change of valid page count may be determined by checking valid page count before and after the update of the map data for the target block. For example, the controller 1004 can check the valid page count in the third section T3, i.e., before the update of map data, and check the valid page count in the fourth section T4 after the update of map data. In addition, the controller 1004 can compare the valid page counts checked in the third section T3 and the fourth section T4 to determine the change of valid page count CH_VPC. Based on the above-described information, the controller 1004 may generate or update a blacklist. Then, the controller 1004 can clean up a map data of at least one block selected based on a comparison result in the fourth section T4.

In another example, the controller 1004 can check the valid page count in the second section T2 when accessing at least one target block. When the update of map data is performed at the third timing t3, the controller 1004 can check the updated valid page count in the third section T3. The controller 1004 can compare the valid page counts checked in the second section T2 and the third section T3 to determine the change of valid page count CH_VPC. Based on the above-described information, the controller 1004 may generate or update a blacklist. Then, the controller 1004 can clean up a map data of at least one block selected based on a comparison result in the fourth section T4. Further, in another example, the controller can check the valid page count in the first section T1, and compare the valid page count checked in the first section T1 with the updated valid page count checked in the third section T3.

As above described, the update of map data can be performed at different timings. Thus, the controller can compare previous and updated valid page counts in different sections. Further, even when the controller accesses a specific block, a valid page count of the block might be not changed because the access is for reading a data in the block or checking a status of the block. Thus, the controller can use the valid page count determined in different sections before the update of map data is performed.

In accordance with an embodiment, when there is a timing reference, e.g., a timing of updating map data, there may be various embodiments for checking valid page count, although not shown. For example, the valid page count can be checked several times before and after the update of map data. The controller can compare one of valid page counts checked before the update of map data with one of updated valid page counts checked after the update of map data to determine the change of valid page count. If the update of map data occurs at the third timing t3, the controller can compare one of valid page counts checked in the first and second section T1, T2 with one of updated valid page counts checked in the third and fourth sections T3, T4.

Figure 9A:
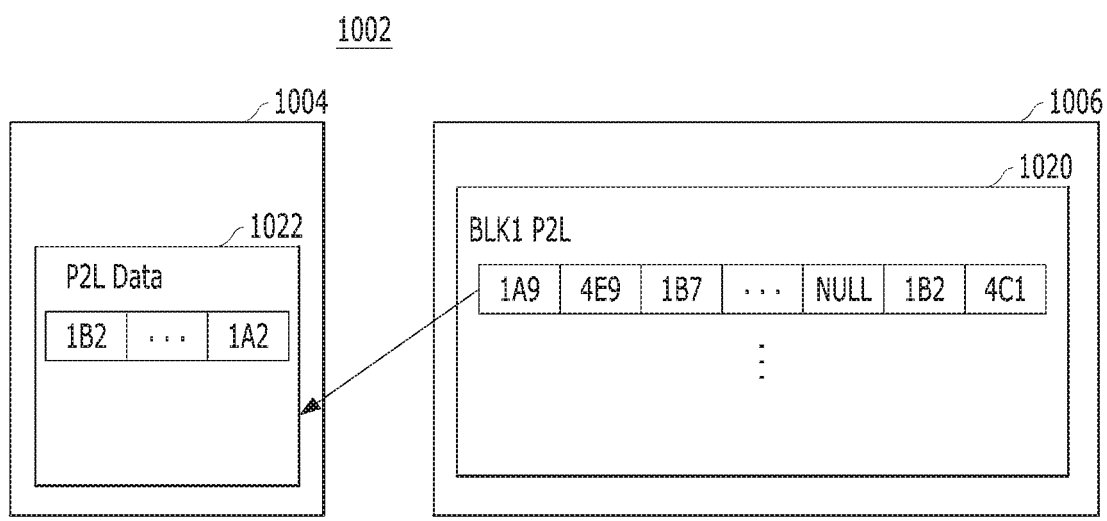
FIGS. 9A and 9B are diagrams describing of cleaning up map data in accordance with an embodiment of the disclosure.
Figure 9B:
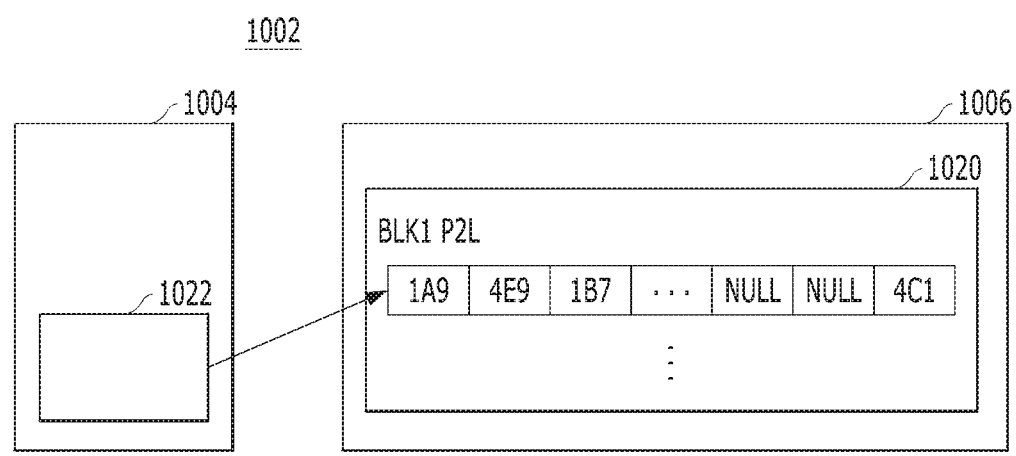

FIGS. 9A and 9B describes cleaning up map data in accordance with an embodiment of the disclosure. As shown, the memory system 1002 may include the controller 1004 and the memory device 1006. The controller 1004 may include a memory 1022 capable of storing data or information. The memory device 1006 may include a map table 1020 storing map data corresponding to data stored in a plurality of blocks in the memory device 1006.

In accordance with an embodiment, a map data regarding a first block (BLK1 P2L) in the map table 1020 can be sequentially written from the first page to the last page. FIG. 9A shows that the controller 1004 loads the map data of the first block (BLK1 P2L) in the memory 1022, and FIG. 9B describes that the controller 1004 stores the map data of the first block (BLK1 P2L) in the memory device 1006 after cleaning up the map data of the first block (BLK1 P2L).

Timings of performing operations shown in 9A and 9B are not the same, and may be after the controller 1004 finishes updating the map data. Referring to FIG. 9A, the controller 1004 may generate map data (P2L Data), which are required to be updated in response to at least one program or erase operation, in the memory 1022. The map data (P2L Data) may be associated with data stored in the first block BLK1. In addition, the map data of the first block (BLK1 P2L) in the map table 1020 shown in FIG. 9A may be in a state in which an operation for cleaning up the map data in accordance with the embodiment of the disclosure is not performed yet. Furthermore, the map data of the first block (BLK1 P2L) in the map table 1020 shown in FIG. 9B may be a state in which the operation for cleaning up the map data in accordance with the embodiment of the disclosure is performed.

Duplicated map data may be generated because the memory device 1006 does not support overwriting. For example, a host can send plural instructions to the memory system 1002 for programming data assigned to the same logical address repeatedly or several times. Since the memory device 1006 does not support overwriting, newly delivered data must be programmed into a new page, i.e., a different location in the memory device 1006. Thus, the memory device 1006 can store plural data corresponding to a single logical address. In a view of map data, a map data associated with a new location storing a data corresponding to a single logical address may be duplicated, as compared with another map data associated with another page previously storing a data corresponding to the same logical address. In accordance with an embodiment, the duplicated map data in the map table may be stored in the same block or another block. Old map data would become invalid, while the last one stored is valid. Thus, the controller 1004 can clean up the map data by invalidating or deleting duplicated one in the map data.

Referring to FIG. 9A, the map data (P2L Data) generated by the controller 1004 may be associated with the first block BLK1 having a valid page count which is reduced. The map data of the first block (BLK1 P2L) in the memory 1022 can include a logical address value "1B2" which is the same as the one included in the map data (P2L Data) for update. The map data (P2L Data) for update is later than the map data of the first block (BLK1 P2L) loaded from the memory device 1006. Since the logical address value "1B2" is duplicated, the controller 1004 can invalidate the old one, i.e., the logical address value "1B2" in the map table 1020. Then, the controller 1004 can store the map data of which some is deleted into the memory device 1006.

In FIG. 9B, the controller 1004 can store in the map table 1020 the map data of the first block (BLK1 P2L) in which the duplicated logical address value "1B2" is invalidated. A location of the re-stored map data of the first block (BLK1 P2L) is different from that of the map data of the first block (BLK1 P2L) described in FIG. 9A. But, the map data of the first block (BLK1 P2L) can be considered a part of the map table 1020. Also, when the new map data of the first block (BLK1 P2L) may be stored, the existing map data of the first block (BLK1 P2L) may no longer be valid. The logical address value "1B2" in the map data of the first block (BLK1 P2L) of FIG. 9A can be changed to "NULL" in FIG. 9B by the controller 1004 invalidating the logical address value "1B2". The map data of the first block (BLK1 P2L) shown in FIG. 9A is invalidated and the map data of the first block (BLK1 P2L) as shown in FIG. 9B can be newly generated.

Figure 10A:
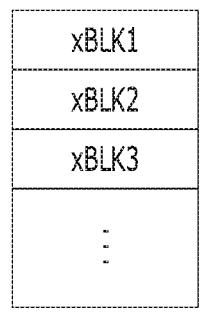
FIGS. 10A and 10B are diagrams illustrating a blocklist in accordance with an embodiment of the disclosure.
Figure 10B:
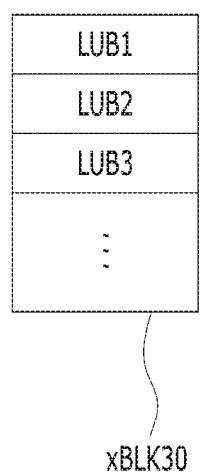

FIGS. 10A and 10B shows a blocklist in accordance with another embodiment of the disclosure.

In FIGS. 10A and 10B, there are simplified blocklists indicating only block numbers excluding block information such as valid page count. The blocklists may not be the entire blocklist used for describing the various examples above.

In FIG. 10A, a third blocklist BL_C includes plural blocks (xBLK1, xBLK2, xBLK3, . . . ) as a target block. In FIG. 10B, a fourth blocklist BL_D may be a plurality of unit blocks (LUB1, LUB2, LUB3, . . . ) as a target block. For example, when a 30th block xBLK30 can be divided into a plurality of unit blocks (LUB1, LUB2, LUB3, . . . ), the blocklist can include the plurality of unit blocks (LUB1, LUB2, LUB3, . . . ) of the 30th block xBLK30. That is, each one of the thirty block (xBLK30) may be considered the target block in the fourth block list BL_D. Also, although not shown, some, but not all, of the thirty block xBLK30 may be included as a target block in the fourth block list BL_D.

In accordance with an embodiment, when the controller 1004 checks or monitors a valid page count for each unit block, the controller 1004 can determine a unit block as a target block included in the blocklist. For example, when the valid page count for a unit block can be measured, checked, or determined, the controller 1004 can clean up, delete, or invalidate some of the map data for the unit block when the change of valid page count regarding the unit block exceeds a predetermined threshold or range.

Figure 11:
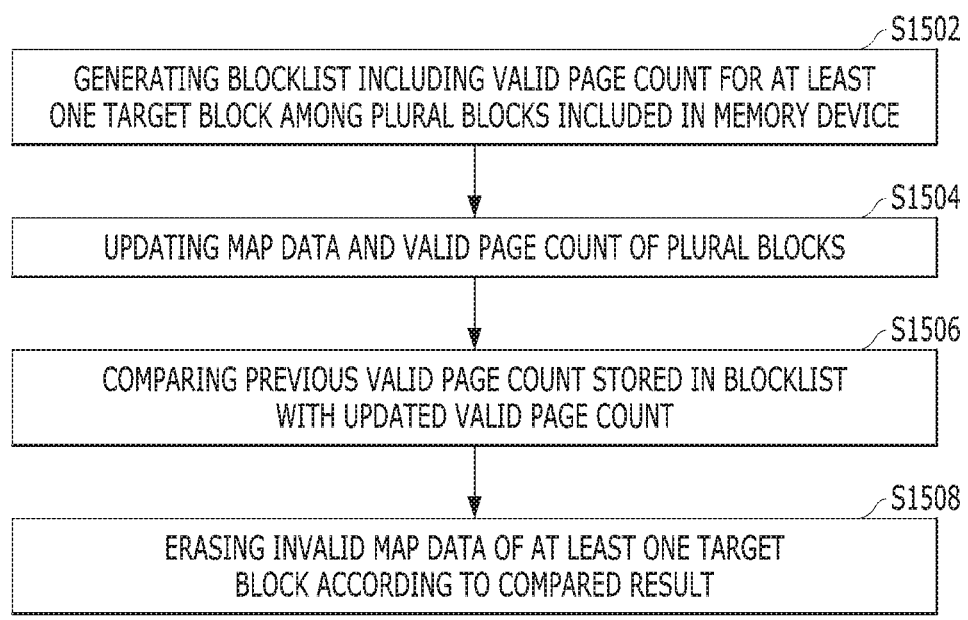
FIG. 11 is a flowchart describing a method for operating a memory system in accordance with an embodiment of the disclosure.

FIG. 11 describes a method for operating a memory system in accordance with an embodiment of the disclosure. The memory system does not support overwriting of the memory device so that unnecessary map data may occur because the host transmits commands to the memory system to repeatedly program the data assigned for the same logical block address (LBA). Garbage collection can increase storage space by cleaning up unnecessary data and map data which are not valid anymore. Herein, the method for preliminarily cleaning up unnecessary map data may reduce a garbage collection overhead.

Referring to FIG. 11, the method for operating the memory system can include generating a blocklist including map data of at least one target block among the plurality of blocks included in the memory device and the number of valid pages (step S1502), updating map data for data programmed into at least one block (step S1504), comparing the valid page count with the updated valid page count for a target block after the map data is updated (step S1506), and erasing invalid map data in the map data of the target block based on a comparison result (step S1508).

In the step S1502, the memory system may generate a blocklist including information for plural blocks as a target block. The blocklist may include the valid page count of each block selected as the target block. There may be various embodiments depending on which block is selected as a target block and when the valid page count for the selected block is gathered or collected. For example, a block recently accessed may be selected as the target block, or a block recently closed may be selected. When a map data update operation may be specified and set as a reference, a block may be selected as the target block before the map data update operation is performed.

In the step S1504, the controller receives a command entered from the host, performs a program operation in response to the command, and generates or updates map data corresponding to the programmed data. The program operation may or may not affect the map data of the target block included in the blocklist generated in the step S1502. For example, unless the data programmed by the controller relevant to the data stored in the target block of the blocklist, the data stored in the target block may still be valid and the map data corresponding to the data may still be valid. However, if the data stored in the target block is updated through the program operation and stored at another location, the map data corresponding to the stored data would be updated. In this case, the valid page count of the target block may vary.

In the step S1506, after the map data is updated in step S1504, the updated valid page count for the target block included in the blocklist generated in the step S1502 can be monitored and recognized. In accordance with an embodiment, the updated blocklist may be separately generated or managed, or the updated valid page count may be accessed and used simply for comparison. In addition, in the step S1506, the change of valid page count can be determined by comparing the previous valid page count of the target block included in the blocklist with the updated valid page count of the same block. In accordance with an embodiment, the target blocks in the blocklist can be sorted or arranged according to the change of the valid page count.

In the step S1508, duplicated map data for at least one target block in the blocklist can be deleted according to the comparison result in the step S1506. Deletion may be considered the invalidation due to characteristics of the memory device. Furthermore, if the change of valid page count for the target block included in the blocklist is equal to or greater than a predetermined threshold in accordance with an embodiment, duplicated map data for the target block in the blocklist can be cleaned up. For example, the predetermined threshold is 45, referring to FIG. 7B, invalid map data regarding the first block xBLK1 can be cleaned up because the change of valid page count for only the first block xBLK1 in the blocklist exceeds the predetermined threshold. On the other hand, if the changes of valid page count for each of the target blocks included in the blocklist are less than the predetermined threshold, cleaning up duplicated map data may not be performed.

Moreover, when the change of valid page count for the target block included in the blocklist is not less than the predetermined threshold, invalidating duplicated map data of the target block selected corresponding to the comparison result is not immediately performed. The operation for invalidation or deleting the invalid map data can be performed later as a separate task or process.

In the method of deleting duplicated map data, the controller can use the map data generated from the program operation performed in the step S1504. The change of valid page count for the target block in the blocklist may be affected by the map data changed due to the program operation in the step S1504. Duplicated map data can be cleaned up by invalidating the old duplicated map data found through comparing the map data generated through the program operation with the previous map data of the map table in the step S1504.

As described above, in the case of a specific condition based on the change in the valid page count, the map data corresponding to the data stored in the block can be deleted or invalidated in advance without garbage collection. This makes it easy to determine that the stored data in the block, which corresponds to the deleted or invalidated map data, may be no longer valid. Therefore, the operation safety and efficiency of the memory system can be improved.

Figure 12:
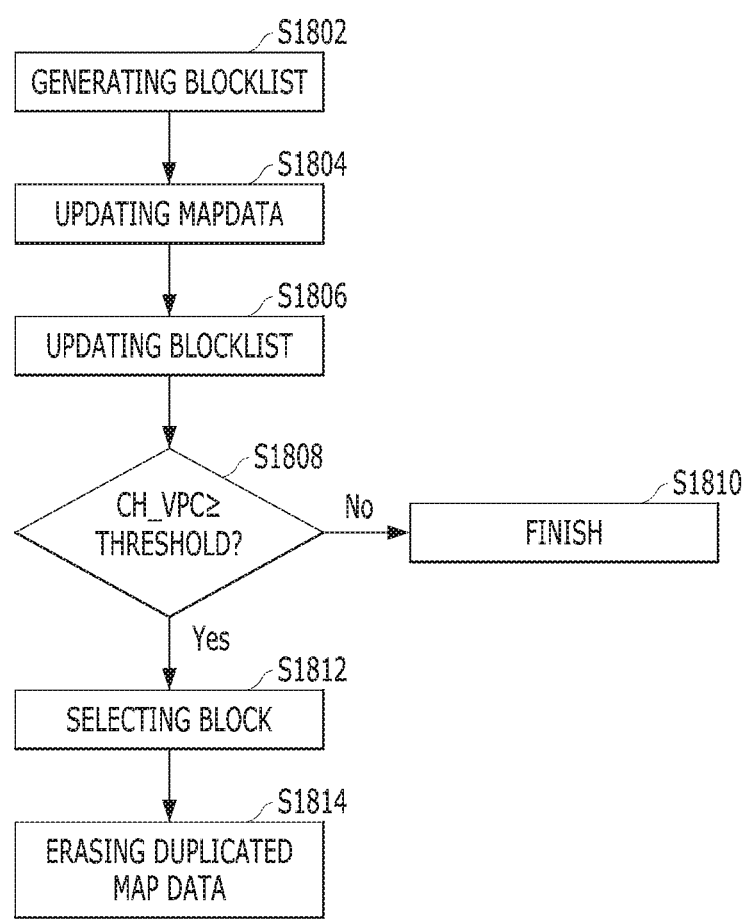
FIG. 12 is a flowchart describing a method for operating a memory system in accordance with another embodiment of the disclosure.

FIG. 12 a method for operating a memory system in accordance with another embodiment of the disclosure.

Referring to FIG. 12, the operation of the memory system includes at least some of the steps of generating a blocklist (step S1802), updating a map data (step S1804), updating a block list (step S1806), determining whether the change of valid page count exceeds a threshold (step S1808), terminating map data cleanup (step S1810), selecting a black (step S1812), and deleting a duplicated map data (step S1814).

In the step S1802, the controller can generate a blacklist including plural blocks as a target block. In addition, the controller can include the valid page count of each block selected as the target block in the blacklist. In order to compare the valid page counts before and after the update of the map data, the controller can determine or select at least one target block to be included in the blacklist before the update of the map data, and check or monitor the valid page count for the selected block. For example, the controller can determine the target block when the block is closed, when a block is recently accessed, and the like.

In the step S1804, the controller receives a command entered from the host and performs the program operation in response to the command. Then, the controller updates the map data. The program operation may or may not affect the map data for the target block selected immediately before. For example, if there is a change in the valid page count of the target block after the map data is updated according to the program operation, there is a high possibility that the map data of the target block should be changed due to the program operation.

In the step S1806 it is possible to measure the updated valid page count of the target block in the blacklist generated in the step S1802, which may be changed due to the update of map data in the step S1804. The updated valid page count may be included in the blocklist. Also, the blocklist may include the change of valid page count determined by comparing the previous valid page count of the target block included in the blocklist generated in the step 1802 with the updated valid page count in the step S1806. In accordance with an embodiment, the controller can sort and arrange blocks of the blacklist in order of a larger change of valid page count for each target block.

In the step S1808, the controller can check whether the change in the valid page count of the target block in the blocklist that is known in the step S1806 is equal to or greater than a predetermined threshold. If the change of valid page count is less than the predetermined threshold, the process can go to the step S1810. In the step S1810, it may be an end state in which the operation process for cleaning up map data is not performed. If the change of valid page count is greater than the predetermined threshold, the step S1812 can be performed. In the step S1812, a block satisfying the condition can be selected from the blocks in the blacklist corresponding to the comparison result obtained in the step S1808.

In the step S1814, the map data of the block selected in the step S1812 can be cleaned up. Specifically, for the map data of the target block included in the blocklist, the controller can clean up the map data of the target block, which is stored before the update of map data, when at least some of the map data for the target block is no longer valid after the map data is updated. In accordance with an embodiment, in the step S1804, the map data generated through the update of the map data is compared with the previous map data of the target block to delete an old one of the duplicated map data. That is, the controller can invalidate the previous map data of the target block in the map table.

Figure 13:
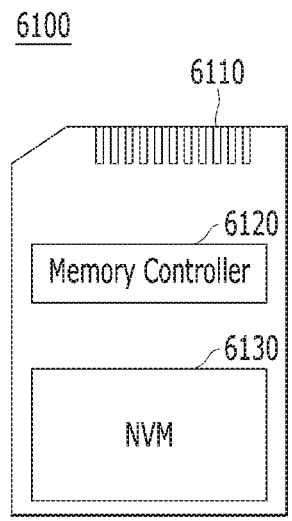
FIGS. 13 to 21 are block diagrams schematically illustrating data processing systems including a memory system in accordance with embodiments of the invention.

In FIG. 13, a data processing system including the memory system in accordance with an embodiment is described. FIG. 13 schematically illustrates a memory card system to which the memory system is applied.

Referring to FIG. 13, the memory card system 6100 may include a memory controller 6120, a memory device 6130 and a connector 6110.

The memory controller 6120 may be connected to the memory device 6130 embodied by a nonvolatile memory. The memory controller 6120 may be configured to access the memory device 6130. By way of example and not limitation, the memory controller 6120 may be configured to control read, write, erase and background operations of the memory device 6130. The memory controller 6120 may be configured to provide an interface between the memory device 6130 and a host, and use a firmware for controlling the memory device 6130. That is, the memory controller 6120 may correspond to the controller 130 of the memory system 110 described with reference to FIGS. 1 and 2, and the memory device 6130 may correspond to the memory device 150 of the memory system 110 described with reference to FIGS. 1 and 5.

Thus, the memory controller 6120 may include a RAM, a processor, a host interface, a memory interface and an error correction component. The memory controller 130 may further include the elements shown in FIGS. 1 and 2.

The memory controller 6120 may communicate with an external device, for example, the host 102 of FIG. 1 through the connector 6110. For example, as described with reference to FIG. 1, the memory controller 6120 may be configured to communicate with an external device according to one or more of various communication protocols such as universal serial bus (USB), multimedia card (MMC), embedded MMC (eMMC), peripheral component interconnection (PCI), PCI express (PCIe), Advanced Technology Attachment (ATA), Serial-ATA, Parallel-ATA, small computer system interface (SCSI), enhanced small disk interface (EDSI), Integrated Drive Electronics (IDE), Firewire, universal flash storage (UFS), WIFI and Bluetooth. Thus, the memory system and the data processing system may be applied to wired/wireless electronic devices, particularly mobile electronic devices.

The memory device 6130 may be implemented by a nonvolatile memory. For example, the memory device 6130 may be implemented by any of various nonvolatile memory devices such as an erasable and programmable ROM (EPROM), an electrically erasable and programmable ROM (EEPROM), a NAND flash memory, a NOR flash memory, a phase-change RAM (PRAM), a resistive RAM (ReRAM), a ferroelectric RAM (FRAM) and a spin torque transfer magnetic RAM (STT-RAM). The memory device 6130 may include a plurality of dies as in the memory device 150 of FIG. 5.

The memory controller 6120 and the memory device 6130 may be integrated into a single semiconductor device. For example, the memory controller 6120 and the memory device 6130 may be integrated to form a solid state driver (SSD). In another embodiment, the memory controller 6120 and the memory device 6130 may be integrated to form a memory card such as a PC card (PCMCIA: Personal Computer Memory Card International Association), a compact flash (CF) card, a smart media card (e.g., a SM and a SMC), a memory stick, a multimedia card (e.g., a MMC, a RS- MMC, a MMCmicro and an eMMC), an SD card (e.g., a SD, a miniSD, a microSD and a SDHC) and/or a universal flash storage (UFS).

Figure 14:
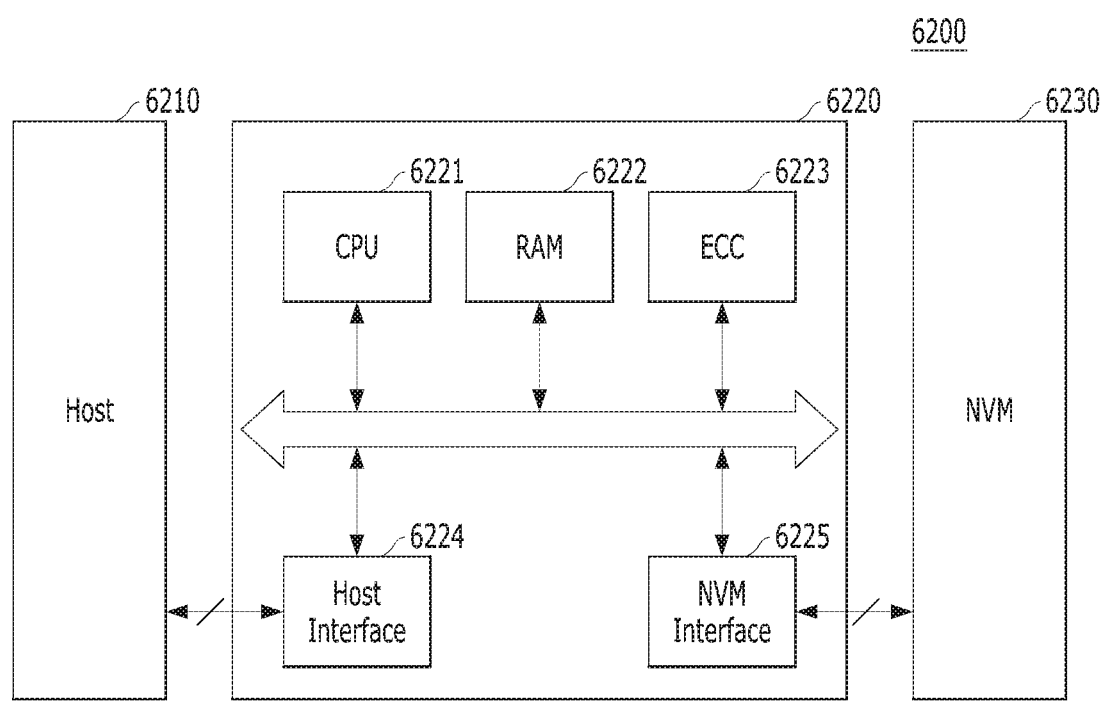

FIG. 14 is a diagram schematically illustrating another example of a data processing system including the memory system in accordance with an embodiment.

Referring to FIG. 14, the data processing system 6200 may include a memory device 6230 having one or more nonvolatile memories and a memory controller 6220 for controlling the memory device 6230. The data processing system 6200 illustrated in FIG. 14 may serve as a storage medium such as a memory card (CF, SD, micro-SD or the like) or USB device, as described with reference to FIGS. 1 and 2. The memory device 6230 may correspond to the memory device 150 in the memory system 110 illustrated in FIGS. 1 and 5. The memory controller 6220 may correspond to the controller 130 in the memory system 110 illustrated in FIGS. 1 and 5.

The memory controller 6220 may control a read, write or erase operation on the memory device 6230 in response to a request of the host 6210. The memory controller 6220 may include one or more CPUs 6221, a buffer memory such as RAM 6222, an ECC circuit 6223, a host interface 6224 and a memory interface such as an NVM interface 6225.

The CPU 6221 may control overall operations on the memory device 6230, for example, read, write, file system management, and bad page management operations. The RAM 6222 may be operated according to control of the CPU 6221. The RAM 6222 may be used as a work memory, buffer memory, or cache memory. When the RAM 6222 is used as a work memory, data processed by the CPU 6221 may be temporarily stored in the RAM 6222. When the RAM 6222 is used as a buffer memory, the RAM 6222 may be used for buffering data transmitted to the memory device 6230 from the host 6210 or transmitted to the host 6210 from the memory device 6230. When the RAM 6222 is used as a cache memory, the RAM 6222 may assist the low-speed memory device 6230 to operate at high speed.

The ECC circuit 6223 may correspond to the ECC component 138 of the controller 130 illustrated in FIG. 1. As described with reference to FIG. 1, the ECC circuit 6223 may generate an ECC (Error Correction Code) for correcting a fail bit or error bit of data provided from the memory device 6230. The ECC circuit 6223 may perform error correction encoding on data provided to the memory device 6230, thereby forming data with a parity bit. The parity bit may be stored in the memory device 6230. The ECC circuit 6223 may perform error correction decoding on data outputted from the memory device 6230. The ECC circuit 6223 may correct an error using the parity bit. For example, as described with reference to FIG. 1, the ECC circuit 6223 may correct an error using the LDPC code, BCH code, turbo code, Reed-Solomon code, convolution code, RSC or coded modulation such as TCM or BCM.

The memory controller 6220 may exchange data with the host 6210 through the host interface 6224. The memory controller 6220 may exchange data with the memory device 6230 through the NVM interface 6225. The host interface 6224 may be connected to the host 6210 through a PATA bus, SATA bus, SCSI, USB, PCIe or NAND interface. The memory controller 6220 may have a wireless communication function with a mobile communication protocol such as WiFi or Long Term Evolution (LTE). The memory controller 6220 may be connected to an external device, for example, the host 6210 or another external device, and then exchange data with the external device. Particularly, as the memory controller 6220 is configured to communicate with the external device through one or more of various communication protocols, the memory system and the data processing system in accordance with an embodiment may be applied to wired/wireless electronic devices, particularly a mobile electronic device.

Figure 15:
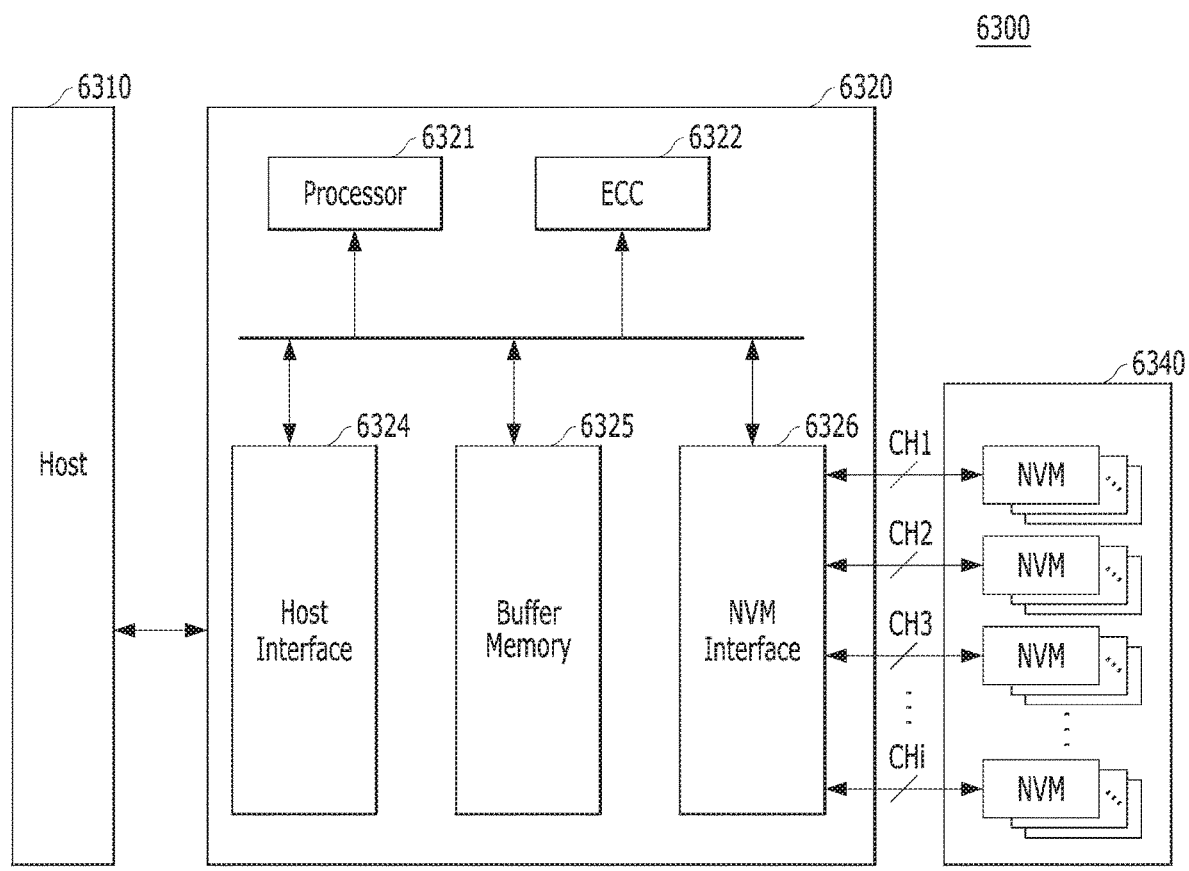

FIG. 15 is a diagram schematically illustrating another example of a data processing system including the memory system in accordance with an embodiment. FIG. 15 schematically illustrates an SSD to which the memory system is applied.

Referring to FIG. 15, the SSD 6300 may include a controller 6320 and a memory device 6340 including a plurality of nonvolatile memories. The controller 6320 may correspond to the controller 130 in the memory system 110 of FIGS. 1 and 2. The memory device 6340 may correspond to the memory device 150 in the memory system of FIGS. 1 and 5.

Specifically, the controller 6320 may be connected to the memory device 6340 through a plurality of channels CH1 to CHi. The controller 6320 may include one or more processors 6321, a buffer memory 6325, an ECC circuit 6322, a host interface 6324 and a memory interface, for example, a nonvolatile memory interface 6326.

The buffer memory 6325 may temporarily store data provided from the host 6310 or data provided from a plurality of flash memories NVM included in the memory device 6340, or temporarily store meta data of the plurality of flash memories NVM, for example, map data including a mapping table. The buffer memory 6325 may be embodied by any of various volatile memories such as DRAM, SDRAM, DDR SDRAM, LPDDR SDRAM and GRAM or nonvolatile memories such as FRAM, ReRAM, STT-MRAM and PRAM. FIG. 15 illustrates that the buffer memory 6325 is disposed in the controller 6320. However, the buffer memory 6325 may be disposed externally to the controller 6320.

The ECC circuit 6322 may calculate an ECC value of data to be programmed to the memory device 6340 during a program operation. The ECC circuit 6322 may perform an error correction operation on data read from the memory device 6340 based on the ECC value during a read operation. The ECC circuit 6322 may perform an error correction operation on data recovered from the memory device 6340 during a failed data recovery operation.

The host interface 6324 may provide an interface function with an external device, for example, the host 6310. The nonvolatile memory interface 6326 may provide an interface function with the memory device 6340 connected through the plurality of channels.

Furthermore, a plurality of SSDs 6300 to which the memory system 110 of FIGS. 1 and 5 is applied may be provided to embody a data processing system, for example, a RAID (Redundant Array of Independent Disks) system. The RAID system may include the plurality of SSDs 6300 and a RAID controller for controlling the plurality of SSDs 6300. When the RAID controller performs a program operation in response to a write command provided from the host 6310, the RAID controller may select one or more memory systems or SSDs 6300 according to a plurality of RAID levels, that is, RAID level information of the write command provided from the host 6310 in the SSDs 6300. The RAID controller may output data corresponding to the write command to the selected SSDs 6300. Furthermore, when the RAID controller performs a read command in response to a read command provided from the host 6310, the RAID controller may select one or more memory systems or SSDs 6300 according to a plurality of RAID levels, that is, RAID level information of the read command provided from the host 6310 in the SSDs 6300. The RAID controller may provide data read from the selected SSDs 6300 to the host 6310.

Figure 16:
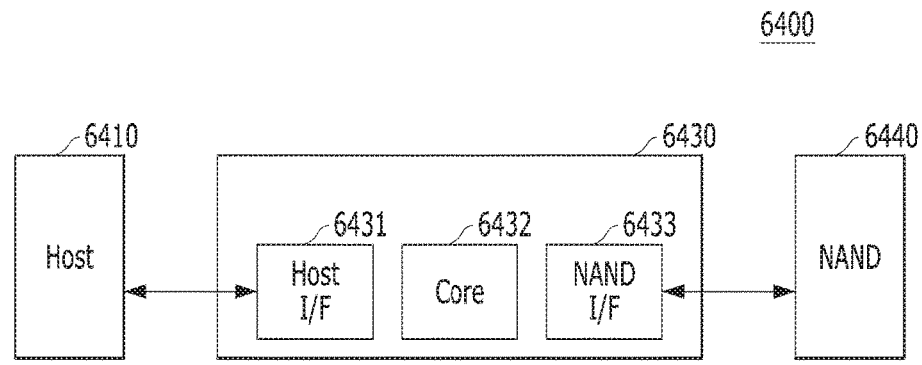

FIG. 16 is a diagram schematically illustrating another example of the data processing system including the memory system in accordance with an embodiment. FIG. 16 schematically illustrates an embedded Multi-Media Card (eMMC) to which the memory system is applied.

Referring to FIG. 16, the eMMC 6400 may include a controller 6430 and a memory device 6440 embodied by one or more NAND flash memories. The controller 6430 may correspond to the controller 130 in the memory system 110 of FIGS. 1 and 2. The memory device 6440 may correspond to the memory device 150 in the memory system 110 of FIGS. 1 and 5.

Specifically, the controller 6430 may be connected to the memory device 6440 through a plurality of channels. The controller 6430 may include one or more cores 6432, a host interface 6431 and a memory interface, for example, a NAND interface 6433.

The core 6432 may control overall operations of the eMMC 6400. The host interface 6431 may provide an interface function between the controller 6430 and the host 6410. The NAND interface 6433 may provide an interface function between the memory device 6440 and the controller 6430. For example, the host interface 6431 may serve as a parallel interface, for example, MMC interface as described with reference to FIG. 1. Furthermore, the host interface 6431 may serve as a serial interface, for example, UHS ((Ultra High Speed)-I/UHS-II) interface.

FIGS. 17 to 20 are diagrams schematically illustrating other examples of a data processing system including the memory system in accordance with embodiments, FIGS. 17 to 20 schematically illustrate UFS (Universal Flash Storage) systems to which the memory system is applied.

Referring to FIGS. 17 to 20, the UFS systems 6500, 6600, 6700, 6800 may include hosts 6510, 6610, 6710, 6810, UFS devices 6520, 6620, 6720, 6820 and UFS cards 6530, 6630, 6730, 6830, respectively. The hosts 6510, 6610, 6710, 6810 may serve as application processors of wired/wireless electronic devices, particularly mobile electronic devices, the UFS devices 6520, 6620, 6720, 6820 may serve as embedded UFS devices, and the UFS cards 6530, 6630, 6730, 6830 may serve as external embedded UFS devices or removable UFS cards.

The hosts 6510, 6610, 6710, 6810, the UFS devices 6520, 6620, 6720, 6820 and the UFS cards 6530, 6630, 6730, 6830 in the respective UFS systems 6500, 6600, 6700, 6800 may communicate with external devices, for example, wired/wireless electronic devices, particularly mobile electronic devices through UFS protocols, and the UFS devices 6520, 6620, 6720, 6820 and the UFS cards 6530, 6630, 6730, 6830 may be embodied by the memory system 110 illustrated in FIGS. 1 and 5. For example, in the UFS systems 6500, 6600, 6700, 6800, the UFS devices 6520, 6620, 6720, 6820 may be embodied in the form of the data processing system 6200, the SSD 6300 or the eMMC 6400 described with reference to FIGS. 13 to 16, and the UFS cards 6530, 6630, 6730, 6830 may be embodied in the form of the memory card system 6100 described with reference to FIG. 13.

Furthermore, in the UFS systems 6500, 6600, 6700, 6800, the hosts 6510, 6610, 6710, 6810, the UFS devices 6520, 6620, 6720, 6820 and the UFS cards 6530, 6630, 6730, 6830 may communicate with each other through an UFS interface, for example, MIPI M-PHY and MIPI UniPro (Unified Protocol) in MIPI (Mobile Industry Processor Interface).

Furthermore, the UFS devices 6520, 6620, 6720, 6820 and the UFS cards 6530, 6630, 6730, 6830 may communicate with each other through various protocols other than the UFS protocol, for example, an UFDs, a MMC, a SD, a mini-SD, and a micro-SD.

Figure 17:
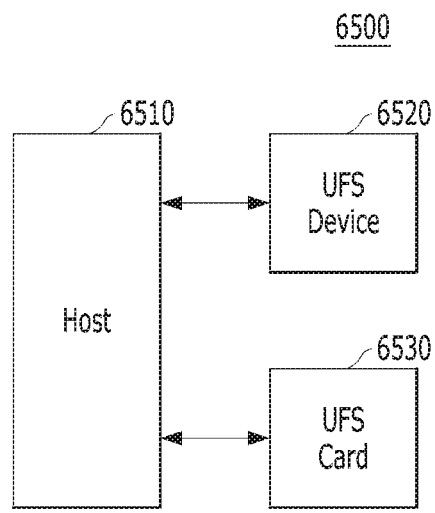

In the UFS system 6500 illustrated in FIG. 17, each of the host 6510, the UFS device 6520 and the UFS card 6530 may include UniPro. The host 6510 may perform a switching operation in order to communicate with the UFS device 6520 and the UFS card 6530. In particular, the host 6510 may communicate with the UFS device 6520 or the UFS card 6530 through link layer switching, for example, L3 switching at the UniPro. The UFS device 6520 and the UFS card 6530 may communicate with each other through link layer switching at the UniPro of the host 6510. In the embodiment of FIG. 17, the configuration in which one UFS device 6520 and one UFS card 6530 are connected to the host 6510 is illustrated by way of example. However, in another embodiment, a plurality of UFS devices and UFS cards may be connected in parallel or in the form of a star to the host 6510. The form of a star is an arrangement where a single centralized component is coupled to plural devices for parallel processing. A plurality of UFS cards may be connected in parallel or in the form of a star to the UFS device 6520 or connected in series or in the form of a chain to the UFS device 6520.

Figure 18:
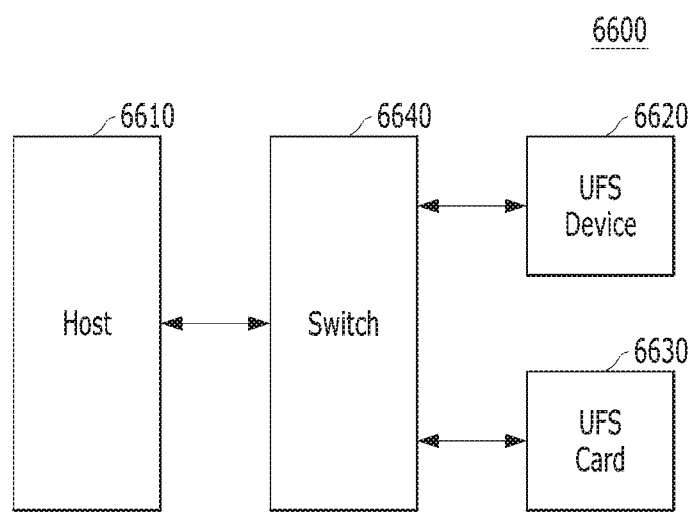

In the UFS system 6600 illustrated in FIG. 18, each of the host 6610, the UFS device 6620 and the UFS card 6630 may include UniPro, and the host 6610 may communicate with the UFS device 6620 or the UFS card 6630 through a switching module 6640 performing a switching operation, for example, through the switching module 6640 which performs link layer switching at the UniPro, for example, L3 switching. The UFS device 6620 and the UFS card 6630 may communicate with each other through link layer switching of the switching module 6640 at UniPro. In the embodiment of FIG. 18, the configuration in which one UFS device 6620 and one UFS card 6630 are connected to the switching module 6640 is illustrated by way of example. However, in another embodiment, a plurality of UFS devices and UFS cards may be connected in parallel or in the form of a star to the switching module 6640, and a plurality of UFS cards may be connected in series or in the form of a chain to the UFS device 6620.

Figure 19:
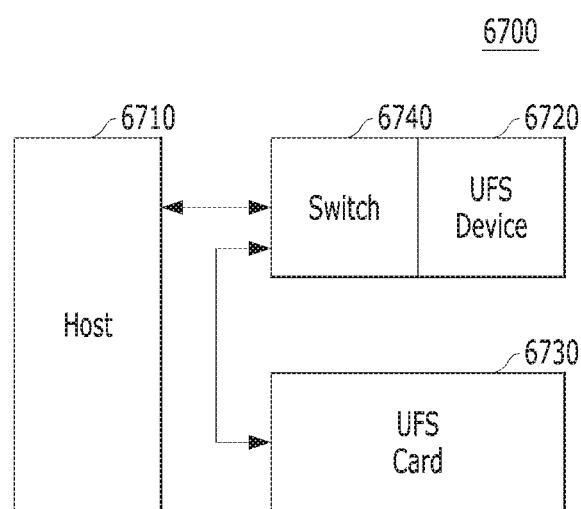

In the UFS system 6700 illustrated in FIG. 19, each of the host 6710, the UFS device 6720 and the UFS card 6730 may include UniPro, and the host 6710 may communicate with the UFS device 6720 or the UFS card 6730 through a switching module 6740 performing a switching operation, for example, through the switching module 6740 which performs link layer switching at the UniPro, for example, L3 switching. The UFS device 6720 and the UFS card 6730 may communicate with each other through link layer switching of the switching module 6740 at the UniPro, and the switching module 6740 may be integrated as one module with the UFS device 6720 inside or outside the UFS device 6720. In the embodiment of FIG. 19, the configuration in which one UFS device 6720 and one UFS card 6730 are connected to the switching module 6740 is illustrated by way of example. However, in another embodiment, a plurality of modules each including the switching module 6740 and the UFS device 6720 may be connected in parallel or in the form of a star to the host 6710 or connected in series or in the form of a chain to each other. Furthermore, a plurality of UFS cards may be connected in parallel or in the form of a star to the UFS device 6720.

Figure 20:
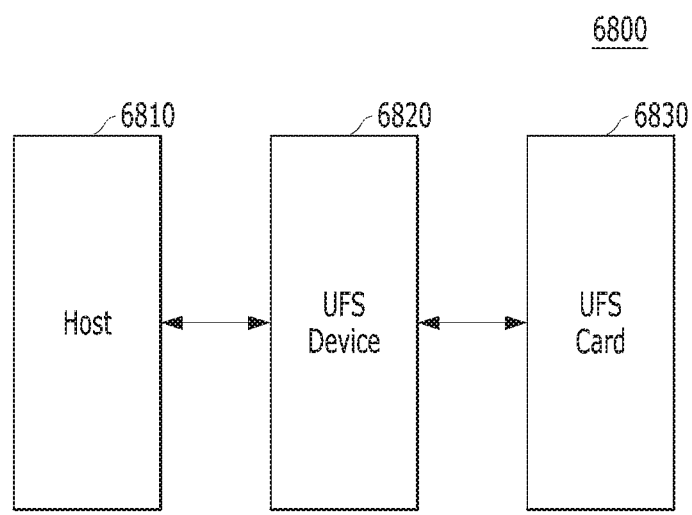

In the UFS system 6800 illustrated in FIG. 20, each of the host 6810, the UFS device 6820 and the UFS card 6830 may include M-PHY and UniPro. The UFS device 6820 may perform a switching operation in order to communicate with the host 6810 and the UFS card 6830. In particular, the UFS device 6820 may communicate with the host 6810 or the UFS card 6830 through a switching operation between the M-PHY and UniPro module for communication with the host 6810 and the M-PHY and UniPro module for communication with the UFS card 6830, for example, through a target ID (Identifier) switching operation. The host 6810 and the UFS card 6830 may communicate with each other through target ID switching between the M-PHY and UniPro modules of the UFS device 6820. In the embodiment of FIG. 20, the configuration in which one UFS device 6820 is connected to the host 6810 and one UFS card 6830 is connected to the UFS device 6820 is illustrated by way of example. However, a plurality of UFS devices may be connected in parallel or in the form of a star to the host 6810, or connected in series or in the form of a chain to the host 6810, and a plurality of UFS cards may be connected in parallel or in the form of a star to the UFS device 6820, or connected in series or in the form of a chain to the UFS device 6820.

Figure 21:
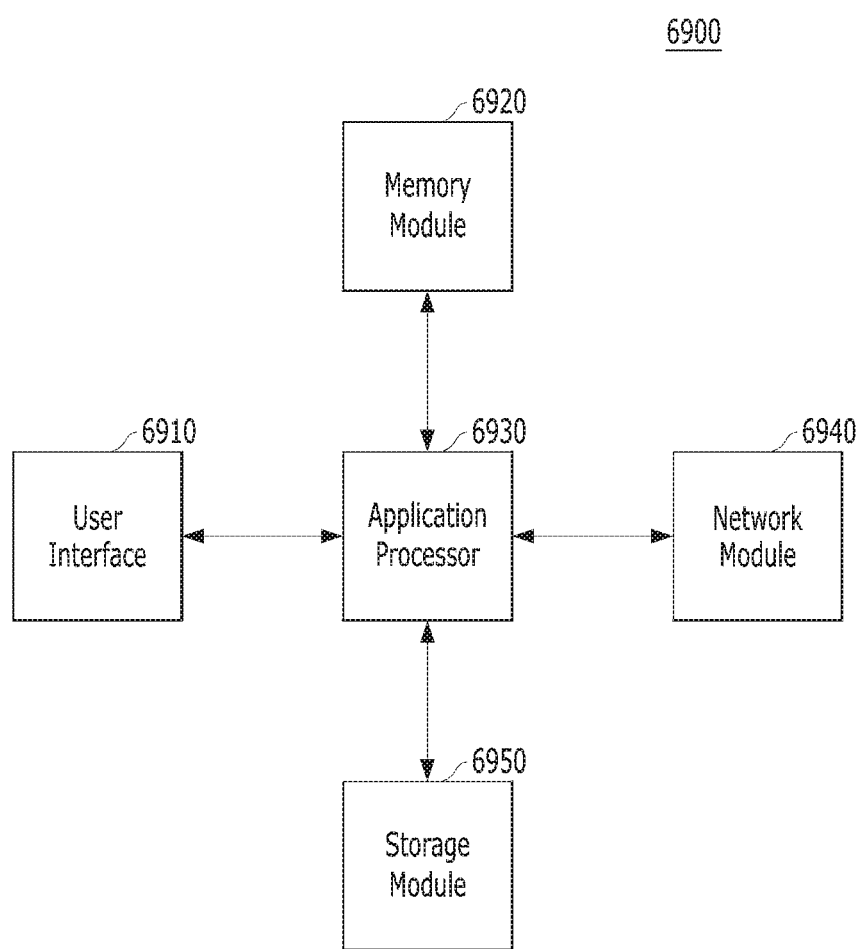

FIG. 21 is a diagram schematically illustrating another data processing system including the memory system in accordance with an embodiment of the disclosure. FIG. 21 is a diagram schematically illustrating a user system to which the memory system is applied.

Referring to FIG. 21, the user system 6900 may include an application processor 6930, a memory module 6920, a network module 6940, a storage module 6950 and a user interface 6910.

Specifically, the application processor 6930 may drive components included in the user system 6900, for example, an OS, and include controllers, interfaces and a graphic engine which control the components included in the user system 6900. The application processor 6930 may be provided as System-on-Chip (SoC).

The memory module 6920 may be used as a main memory, work memory, buffer memory, or cache memory of the user system 6900. The memory module 6920 may include a volatile RAM such as DRAM, SDRAM, DDR SDRAM, DDR2 SDRAM, DDR3 SDRAM, LPDDR SDARM, LPDDR2 SDRAM or LPDDR3 SDRAM or a nonvolatile RAM such as PRAM, ReRAM, MRAM or FRAM. For example, the application processor 6930 and the memory module 6920 may be packaged and mounted, based on POP (Package on Package).

The network module 6940 may communicate with external devices. For example, the network module 6940 may not only support wired communication, but also support various wireless communication protocols such as code division multiple access (CDMA), global system for mobile communication (GSM), wideband CDMA (WCDMA), CDMA-2000, time division multiple access (TDMA), long term evolution (LTE), worldwide interoperability for microwave access (Wimax), wireless local area network (WLAN), ultra-wideband (UWB), Bluetooth, wireless display (WI-DI), thereby communicating with wired/wireless electronic devices, particularly mobile electronic devices. Therefore, the memory system and the data processing system, in accordance with an embodiment of the disclosure, can be applied to wired/wireless electronic devices. The network module 6940 may be included in the application processor 6930.

The storage module 6950 may store data, for example, data received from the application processor 6930, and then may transmit the stored data to the application processor 6930. The storage module 6950 may be embodied by a nonvolatile semiconductor memory device such as a phase-change RAM (PRAM), a magnetic RAM (MRAM), a resistive RAM (ReRAM), a NAND flash, a NOR flash and a 3D NAND flash, and provided as a removable storage medium such as a memory card or external drive of the user system 6900. The storage module 6950 may correspond to the memory system 110 described with reference to FIGS. 1 and 5. Furthermore, the storage module 6950 may be embodied as an SSD, an eMMC and an UFS as described above with reference to FIGS. 15 to 20.

The user interface 6910 may include interfaces for inputting data or commands to the application processor 6930 or outputting data to an external device. For example, the user interface 6910 may include user input interfaces such as a keyboard, a keypad, a button, a touch panel, a touch screen, a touch pad, a touch ball, a camera, a microphone, a gyroscope sensor, a vibration sensor and a piezoelectric element, and user output interfaces such as a liquid crystal display (LCD), an organic light emitting diode (OLED) display device, an active matrix OLED (AMOLED) display device, an LED, a speaker and a monitor.

Furthermore, when the memory system 110 of FIGS. 1 and 5 is applied to a mobile electronic device of the user system 6900, the application processor 6930 may control overall operations of the mobile electronic device. The network module 6940 may serve as a communication module for controlling wired/wireless communication with an external device. The user interface 6910 may display data processed by the application processor 6930 on a display/touch module of the mobile electronic device. Further, the user interface 6910 may support a function of receiving data from the touch panel.

Figure 22:
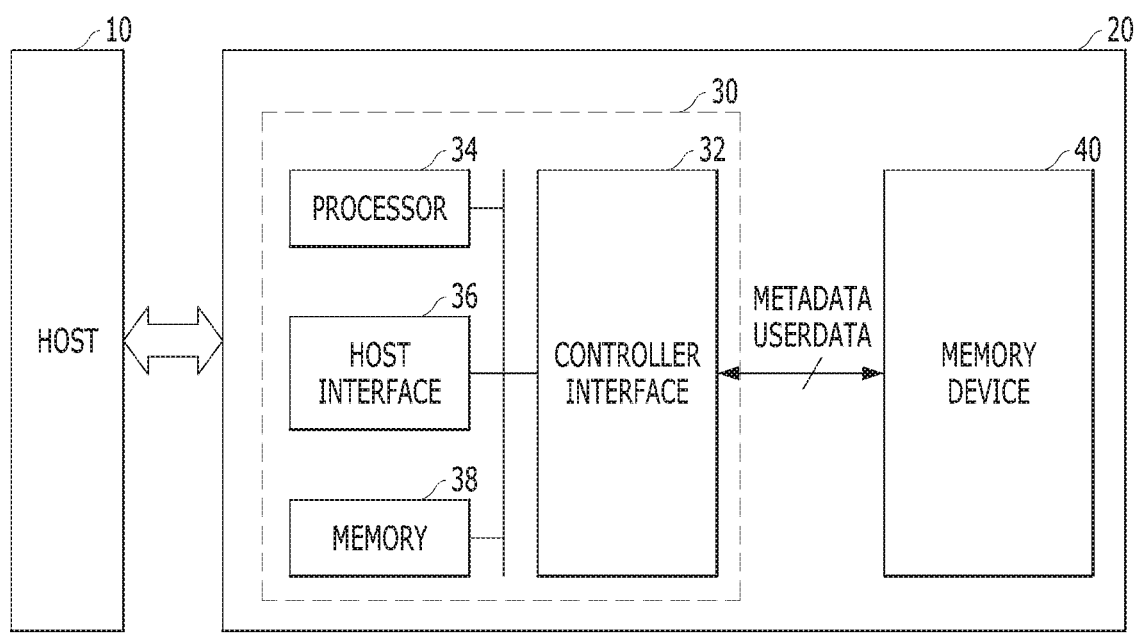
FIG. 22 is a block diagram illustrating a memory system in accordance with an embodiment of the disclosure.

In FIG. 22, a host 10 and a memory system 20 in accordance with an embodiment of the disclosure are described. The host 10, the memory system 20 and other components can be constituted with a data processing system in accordance with an embodiment of the disclosure. In a computing device or a mobile device embedded with the memory system 20, the memory system 20 is engaged with the host 10 to exchange data.

Referring to FIG. 22, the memory system 20 can include a controller 30 and a memory device 40. The controller 30 receives and outputs data, requested from the host 10, from the memory device 40 or stores the data transferred from the host 10 into the memory device 40 in order to perform command operations requested from the host 10. The memory device 40 includes a plurality of memory cells capable of storing data. Further, the internal configuration of the memory device 40 can be changed in accordance with the characteristics of the memory device 40, the purposes for which the memory system 20 is used, the specifications of the memory system 20 required by the host 10, or the like. For example, the memory device 1006, 150 illustrated in FIGS. 1 to 5 and the memory device 40 of FIG. 22 may include the same components. In addition, the controller 1004, 130 described in FIGS. 1 to 5 and the controller 30 shown in FIG. 22 may include the same components.

The controller 30 may include at least one processor 34, a host interface 36, a buffer 28, and a controller interface 32. The processor 34, for command operations within the controller 30, can play a role similar to that of a CPU used in a computing device. The host interface 36 is for data communication between the memory system 20 and the host 10, while the controller interface 32 is for data communication between the memory device 40 and the controller 30. The memory 38 temporarily stores the data and operation status required during operations performed by the processor 34, the host interface 36 and the controller interface 32. Or, the memory 38 can temporarily store I/O data between the memory device 40 and the host 10. The internal configuration of the above-described controller 30 may be a function classification according to an operation, a task, or the like which is handled or processed by the controller.

In accordance with an embodiment, the physical configuration of the controller 30 may be composed of at least one processor, at least one memory, at least one input/output port, and a wiring for electrical connection between the above-mentioned components.

The controller 30 and the memory device 40 can exchange a metadata and a user data with each other. The user data includes data to be stored by a user through the host 10, and the metadata includes system information (e.g., map data and the like) necessary for storing and managing the user data in the memory device 40. The user data and the meta data can be processed or managed in different ways in the controller 30 because the properties of the data are different from each other.

As a storage capacity of the memory device 40 increases, the status information and the like have bigger sizes, which can include system information, map information, and/or operation information necessary for operations such as reading, programming, and erasing data within a plurality of dies, a plurality of blocks, or a plurality of pages included in the memory device 40. It is difficult for the controller 30 to store all the status information and the like in the memory 38. Thus, the system information, the map information, the operation information, and the like for operation such as reading, programming, erasing, etc., may be stored in the memory device 40, as well as user data. The controller 30 may load, from the plurality of dies, blocks in the memory device 40, some information necessary for operations such as reading, programming, or deleting data in a plurality of pages from the memory device 40, and then re-stores the updated information in the memory device 40 after the corresponding operation is completed.

Although not shown, as the number of memory cells capable of storing data in the memory device 40 increases, the internal structure of the memory device 40 can be complicated. The controller 30 may transmit or receive connection information according to the internal configuration of the memory device 40 together with the data. For example, in a case when a plurality of dies is included in the memory device 40, there are n channels and m ways (n, m is an integer larger than 1) between the controller 30 and the memory device 40. The data and the connection information may be transferred via the n channels and the m ways. However, in order for the controller 30 to read or write data to the memory device 40, additional control variables or control signals may be needed depending on the internal structure of the memory device 40. As more dies are included in the memory device 40, additional information required for performing operations becomes larger.

The host 10 and the memory system 20 can exchange commands, addresses, data, and the like with each other, according to a predetermined protocol, a system communication method, or an interface. Thus, the host 10 may not need to be aware of the specific structure within the memory system 20. When the host 10 stores a specific data to the memory system 20 or attempts to read a data stored in the memory system 20, the host 10 sends a logical block address (LBA). The logical block address (LBA) is a logical block addressing method, and may be a format used to specify the location of a data block to be recorded in a storage device associated with a computing device. For example, in the case of a conventional hard disk, an addressing method indicating a physical structure included in a hard disk, such as a cylinder, a head, and a sector (Cylinder-Head-Sector, CHS) was used. However, the address system corresponding to the physical structure of the hard disk has reached the limit as the storage capacity of the hard disk increases. In such a large-capacity storage device, the address can be specified in a manner that the sectors are arranged in a logical sequence in a row, and the sectors are numbered (for example, in order from 0), regardless of the physical structure of the hard disk. Instead of the host 10 transferring or pointing data only to the logical block address (LBA), the controller 30 included in the memory system 20 may store and manage the physical address, which is the address in the memory device 40 where the actual data is stored, It is necessary to match and manage the logical block address (LBA) used by the host 10. Such information may be included in a metadata and may be distinguished from a user data stored or read by the host 10.

As the amount of data that can be stored in the memory device 40 increases, efficient management of metadata may be required. Also, as the size of the plurality of blocks included in the memory device 40 increases, the amount of data that can be stored increases as well as the amount of metadata also increases. This increases the resources (e.g., time) required to maintain and manage the stored data in the memory device 40 so that the apparatus and method for increasing the operational efficiency, stability, or reliability of the memory system 20 may be required.

In accordance with an embodiment, the memory system 20 may include a memory device 40 that includes a plurality of blocks capable of storing data. The memory system 20 generates a blocklist including a valid page count regarding at least one target block before performing the operation of updating a map data, and performs an operation of updating the map data. The controller 30 may compare the previous valid page count of the target block with the updated valid page count and delete or invalidate some invalid map data of the target block selected according to a comparison result.

In accordance with an embodiment, the target block can be selected when a new data cannot be programmed therein without a delete operation. In accordance with another embodiment, the target block may include a predetermined number of blocks from the block most recently accessed by the controller 30 in a time reversed order.

In accordance with an embodiment, the blocklist may include the updated valid page count, and the controller 30 may arrange or sort the target block of the block list in a descending order of the valid page count and the change of valid page count.

The controller 30 determines whether the difference between the valid page count of the target block and the updated valid page count is greater than or equal to a predetermined threshold or range. If the difference is greater than or equal to the predetermined threshold, the controller 30 can check whether map data of the target block is duplicated. At this time, the map data may include second address information (Physical to Logical, P2L) for converting a physical address into a logical address, and the controller 30 may delete the old address data when there is duplicated map data in the address information.

In accordance with an embodiment, a block is an operational unit in which an erase operation is performed, and each block can be divided into a plurality of unit blocks. The unit block can be an operational unit in which grouped map data is assigned. The grouped map data includes plural map data controlled as a group. The controller 30 can determine the valid page count regarding each unit block. As the target block included in the blocklist, the unit block may be used. The valid page count of the unit block can be included in the blocklist.

In accordance with an embodiment, the controller 30 may delete some invalid map data of the target block and then store the cleaned up map data of the target block in the memory device.

As described above, in an embodiment of the disclosure, when the map data for at least one page storing redundant data is canceled, which is monitored or determined by comparing the valid page counts of the target block before and after the operation of updating the map data is performed. It is possible to greatly reduce a time required to identify and determine valid data in the memory device during garbage collection and the like, so that an operation margin for the garbage collection can be effectively controlled.

As above described, a memory system, a data processing system, an operation method thereof, and a method for confirming an operation thereof in accordance with embodiments of the disclosure can compare the numbers of valid pages before and after performing an operation of updating map data of a target block, and delete or erase a map data regarding a page storing a redundant or duplicated data. There is an advantage that a time required for identifying and determining a valid data stored in the memory device can be greatly reduced by a method and an apparatus for deleting or erasing the map data regarding the page storing the redundant or duplicated data.

Further, embodiments in accordance with the disclosure can shorten a time required for determining whether each page stores valid data for garbage collection in each of a plurality of blocks capable of storing a large amount of data. Thus, it is possible to increase or improve stability and reliability of operations performed within the memory system.

While the disclosure illustrates and describes specific embodiments, it will be apparent to those skilled in the art in light of the present disclosure that various changes and modifications may be made without departing from the spirit and scope of the invention as defined in the following claims.

What is claimed is:

1. A memory system, comprising:
    a memory device including plural blocks, each storing data; and
    a controller coupled with the memory device and configured to:
        perform a data input/output (I/O) operation associated with at least one target block among the plural blocks;
        generate a blocklist including a previous valid page count associated with the at least one target block among the plural blocks;
        update map data, changed by the data I/O operation, in the memory device;
        generate an updated valid page count associated with the at least one target block after updating the map data;
        compare the previous valid page count stored in the blocklist with the updated valid page count; and
        erase invalid map data associated with the at least one target block according to a comparison result.

2. The memory system according to claim 1, wherein the at least one target block is in a status such that new data cannot be programmed in the at least one target block without an erase operation to data stored therein.

3. The memory system according to claim 1, wherein the at least one target block includes a predetermined number of blocks which are selected in a reverse order of time from a block last accessed by the controller.

4. The memory system according to claim 1, wherein the blocklist includes the updated valid page count.

5. The memory system according to claim 1, wherein the controller arranges or sorts the at least one target block in the blocklist in a descending order of a difference between the previous valid page count and the updated valid page count.

6. The memory system according to claim 5, wherein the controller determines whether the difference between the previous valid page count and the updated valid page count is equal to or greater than a predetermined threshold, and checks whether there are duplicated map data of the target block when the difference is equal to or greater than the predetermined threshold.

7. The memory system according to claim 6,
    wherein the map data of the target block includes mapping information for translating a physical address to a logical address, and
    wherein, when there are duplicated map data, the controller erases an old one of the duplicated map data.

8. The memory system according to claim 1,
    wherein the block is an operational unit for an erase operation, and the block includes plural unit blocks, each assigned to each of plural map data controlled as a group,
    wherein the controller determines the valid page count associated with each unit block, and the blocklist includes the valid page count associated with each unit block selected as the target block.

9. The memory system according to claim 1, wherein the controller stores the map data associated with the at least one target block, in the memory device, after erasing the invalid map data.

10. The memory system according to claim 1, wherein the controller includes:
    a blocklist generating circuitry for selecting the at least one target block included in the memory device to generate the blocklist including information associated with the at least one target block; and
    a map data managing circuitry, coupled to the blocklist generating circuitry, for comparing the previous valid page count with the updated valid page count, for each of the at least one target block, and erasing the invalid map data according to the comparison result.

11. An apparatus for controlling a metadata included in a memory system including at least one processor and at least one memory including computer program code, wherein the at least one memory and the computer program code are configured, with the at least one processor, to cause the apparatus to:
    perform a data input/output (I/O) operation associated with at least one target block among plural blocks included in a memory device of the memory system;
    generate a blocklist including a previous valid page count associated with the at least one target block among the plural blocks included in the memory device;
    update map data, changed by the data I/O operation, in the memory device;

generate an updated valid page count associated with the at least one target block after updating the map data;
compare the previous valid page count stored in the blocklist with the updated valid page count; and
erase invalid map data associated with the at least one target block according to a compared result.

12. A method for operating a memory system, the method comprising:
performing a data input/output (I/O) operation associated with at least one target block among plural blocks included in a memory device of the memory system;
generating a blocklist including a previous valid page count associated with the at least one target block among the plural blocks included in the memory device;
updating map data, changed by the data I/O operation, in the memory device;
generate an updated valid page count associated with the at least one target block after updating the map data;
comparing the previous valid page count stored in the blocklist with the updated valid page count; and
erasing invalid map data associated with the at least one target block according to a compared result.

13. The method according to claim 12, further comprising determining whether the at least one target block is in a status such that new data cannot be programmed in the at least one target block without an erase operation to data stored therein.

14. The method according to claim 12, wherein the at least one target block includes a predetermined number of blocks which are selected in a reverse order of time from a block last accessed by the controller.

15. The method according to claim 12, wherein the blocklist includes the updated valid page count.

16. The method according to claim 12, further comprising arranging or sorting the at least one target block in the blocklist in a descending order of a difference between the previous valid page count and the updated valid page count.

17. The method according to claim 12, further comprising:
determining whether the difference between the previous valid page count and the updated valid page count is equal to or greater than a predetermined threshold; and
checking whether there are duplicated map data of the target block when the difference is equal to or greater than the predetermined threshold.

18. The method according to claim 17,
wherein the invalid map data is, when there are duplicated map data, an old one of the duplicated map data,
wherein the map data of the target block includes mapping information for translating a physical address to a logical address.

19. The method according to claim 12,
wherein the block is an operational unit for an erase operation, and the block includes plural unit blocks, each assigned to each of plural map data controlled as a group,
wherein the controller determines the valid page count associated with each unit block, and the blocklist includes the valid page count associated with each unit block selected as the target block.

20. The method according to claim 12, further comprising storing the map data associated with the at least one target block, in the memory device, after erasing the invalid map data.

* * * * *